US012639097B2

(12) United States Patent
Li

(10) Patent No.: US 12,639,097 B2
(45) Date of Patent: May 26, 2026

(54) DATA FLOW MIRRORING METHOD AND APPARATUS

(71) Applicant: HUAWEI TECHNOLOGIES CO., LTD., Shenzhen (CN)

(72) Inventor: Shitao Li, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 608 days.

(21) Appl. No.: 18/308,082

(22) Filed: Apr. 27, 2023

(65) Prior Publication Data

US 2023/0259387 A1 Aug. 17, 2023

Related U.S. Application Data

(63) Continuation of application No. PCT/CN2021/125202, filed on Oct. 21, 2021.

(30) Foreign Application Priority Data

Oct. 29, 2020 (CN) .......................... 202011187447.6

(51) Int. Cl.
*G06F 9/455* (2018.01)
(52) U.S. Cl.
CPC .................... *G06F 9/45558* (2013.01); *G06F 2009/45595* (2013.01)
(58) Field of Classification Search
CPC ....... G06F 9/45558; G06F 2009/45595; G06F 11/3006; G06F 11/301; G06F 11/3089;
(Continued)

(56) References Cited

U.S. PATENT DOCUMENTS

| 10,063,415 B1 * | 8/2018 | Kanakarajan ....... H04L 41/0806 |
| 10,298,488 B1 * | 5/2019 | Wood ...................... H04L 45/12 |

(Continued)

FOREIGN PATENT DOCUMENTS

| EP | 3633920 A1 | 4/2020 |
| JP | 2015171128 A | 9/2015 |

(Continued)

OTHER PUBLICATIONS

Japanese Office Action issued in corresponding Japanese Application No. 2023-526429, dated Jan. 21, 2025, pp. 1-5.

(Continued)

*Primary Examiner* — Adam Lee
(74) *Attorney, Agent, or Firm* — HAUPTMAN HAM, LLP

(57) ABSTRACT

This application relates to the field of NFV technologies, and discloses a data flow mirroring method and an apparatus. The method includes: An NFVO receives an instantiation request from an OSS/BSS, and obtains NSD information based on the instantiation request, where the NSD information includes first mirroring object information, the first mirroring object information describes information for creating a first mirroring object, and the first mirroring object is for mirroring a first data flow; and requests, based on the first mirroring object information, a VIM to create the first mirroring object, where the first mirroring object is associated with a first mirroring service. According to the method, the NSD information is extended, to include mirroring object information.

20 Claims, 9 Drawing Sheets

(58) Field of Classification Search
CPC ................ G06F 9/5072; G06F 9/5077; G06F 2009/45562; G06F 2201/815; G06F 8/63; G06F 2009/4557; H04L 63/20
USPC .......................................................... 718/1
See application file for complete search history.

(56) References Cited

U.S. PATENT DOCUMENTS

| | | | | |
|---|---|---|---|---|
| 10,700,928 | B2 * | 6/2020 | Li ........................ | H04L 41/0806 |
| 11,240,135 | B1 * | 2/2022 | Melkild ................... | G06F 9/48 |
| 2013/0091180 | A1 * | 4/2013 | Vicat-Blanc-Primet .................... | G06F 16/22 707/803 |
| 2016/0191391 | A1 * | 6/2016 | Wood ..................... | H04L 45/02 370/235 |
| 2016/0328258 | A1 * | 11/2016 | Iwashina ............. | G06F 9/45533 |
| 2016/0352538 | A1 | 12/2016 | Chiu et al. | |
| 2016/0364226 | A1 * | 12/2016 | Takano ............... | G06F 9/45558 |
| 2017/0048165 | A1 * | 2/2017 | Yu ........................ | H04L 41/044 |
| 2017/0063598 | A1 * | 3/2017 | Zhu ........................ | H04L 67/34 |
| 2017/0141944 | A1 * | 5/2017 | Lee ..................... | H04L 41/0866 |
| 2017/0187572 | A1 * | 6/2017 | Wu ........................ | H04L 43/50 |
| 2017/0289791 | A1 * | 10/2017 | Yoo ..................... | H04W 68/005 |
| 2017/0315844 | A1 * | 11/2017 | Ji .............................. | G06F 9/50 |
| 2018/0004563 | A1 * | 1/2018 | Miyazaki .............. | G06F 9/5077 |
| 2018/0018244 | A1 * | 1/2018 | Yoshimura ............ | G06F 9/5077 |
| 2018/0026855 | A1 * | 1/2018 | Ji ........................ | H04L 41/0894 709/223 |
| 2018/0034709 | A1 * | 2/2018 | Chen ..................... | H04L 41/40 |
| 2018/0062946 | A1 * | 3/2018 | Zhu ..................... | H04L 41/5041 |
| 2018/0069809 | A1 * | 3/2018 | Oswal ................. | H04L 12/4641 |
| 2018/0123928 | A1 | 5/2018 | Moradi et al. | |
| 2018/0131557 | A1 * | 5/2018 | Chou ..................... | H04L 41/044 |
| 2018/0139109 | A1 * | 5/2018 | Zuerner .............. | H04L 41/5051 |
| 2018/0145889 | A1 * | 5/2018 | Xu ........................ | G06F 9/5077 |
| 2018/0181424 | A1 * | 6/2018 | Gokurakuji .......... | G06F 9/5077 |
| 2018/0191581 | A1 * | 7/2018 | Yu ........................ | H04L 41/042 |
| 2018/0248867 | A1 * | 8/2018 | Liu ..................... | H04L 9/3268 |
| 2018/0262410 | A1 * | 9/2018 | Chou ..................... | H04L 41/40 |
| 2018/0307538 | A1 * | 10/2018 | Meng ................... | G06F 9/5061 |
| 2018/0309646 | A1 * | 10/2018 | Mustafiz ................ | H04L 41/40 |
| 2018/0316543 | A1 * | 11/2018 | Hwang .............. | G06F 9/45558 |
| 2018/0316559 | A1 * | 11/2018 | Thulasi .............. | H04L 41/0895 |
| 2018/0316578 | A1 * | 11/2018 | Shen .................. | H04L 41/0895 |
| 2018/0324261 | A1 * | 11/2018 | Yi ........................... | H04L 67/51 |
| 2019/0052528 | A1 * | 2/2019 | Yoshimura .......... | H04L 41/0897 |
| 2019/0065234 | A1 * | 2/2019 | Zembutsu .............. | H04L 47/82 |
| 2019/0068463 | A1 * | 2/2019 | Li ...................... | H04L 41/0806 |
| 2019/0089780 | A1 * | 3/2019 | Yousaf ............... | G06F 9/45533 |
| 2019/0129745 | A1 * | 5/2019 | Wang .................. | H04L 41/0895 |
| 2019/0140921 | A1 * | 5/2019 | Xu ........................ | H04W 28/26 |
| 2019/0173802 | A1 * | 6/2019 | Xia ..................... | H04L 41/5045 |
| 2019/0208404 | A1 * | 7/2019 | Georgiev ................ | H04L 67/51 |
| 2019/0303490 | A1 * | 10/2019 | Chen .................. | G06F 11/1464 |
| 2019/0319859 | A1 * | 10/2019 | Casey ................. | H04L 63/145 |
| 2019/0334788 | A1 * | 10/2019 | Lacey ................... | G06F 21/105 |
| 2019/0356559 | A1 * | 11/2019 | Kern .................... | H04L 41/042 |
| 2019/0363953 | A1 * | 11/2019 | Chou ................... | H04W 16/18 |
| 2020/0034165 | A1 * | 1/2020 | Chou ................. | H04L 41/5045 |
| 2020/0313981 | A1 * | 10/2020 | Chatras .............. | H04L 61/4511 |
| 2020/0329381 | A1 * | 10/2020 | Chou ................... | H04W 24/02 |
| 2020/0412596 | A1 * | 12/2020 | Cherunni ............. | G06F 9/5077 |
| 2021/0029204 | A1 * | 1/2021 | Bhatnagar .............. | H04L 43/16 |
| 2021/0051059 | A1 * | 2/2021 | Meirosu ............. | H04L 41/0895 |
| 2021/0051077 | A1 * | 2/2021 | Dempo .............. | G06F 9/45558 |
| 2021/0064410 | A1 * | 3/2021 | Yun ..................... | H04L 41/5041 |
| 2021/0075701 | A1 * | 3/2021 | Kalpatapu ............... | H04L 41/40 |
| 2021/0092020 | A1 * | 3/2021 | Maguire ................ | H04L 41/40 |
| 2021/0153069 | A1 * | 5/2021 | De Domenico ...... | H04W 28/24 |
| 2021/0176113 | A1 * | 6/2021 | Szabo ................... | H04L 41/122 |
| 2021/0288879 | A1 * | 9/2021 | Yao ..................... | G06F 9/45537 |
| 2022/0086698 | A1 * | 3/2022 | Yao ................... | H04W 28/0268 |
| 2022/0413937 | A1 * | 12/2022 | Xie ..................... | G06F 9/45558 |
| 2023/0037914 | A1 * | 2/2023 | Gritli .................. | H04L 41/0806 |
| 2023/0041981 | A1 * | 2/2023 | Srinivasan .......... | H04L 41/0806 |

FOREIGN PATENT DOCUMENTS

| | | |
|---|---|---|
| JP | 2020510384 A | 4/2020 |
| WO | 2016121882 A1 | 8/2016 |

OTHER PUBLICATIONS

India Office Action issued in corresponding India Application No. 202327030112, dated May 1, 2024, pp. 1-6.

Japanese Office Action issued in corresponding Japanese Application No. 2023-526429, dated Jul. 29, 2024, pp. 1-15.

Anonymous, "Date of ETSI NFV-IFA #201 meeting", NFV-IFA, Jun. 15, 2020 (Jun. 15, 2020), pp. 1-2, XP093136501, Retrieved from the Internet: https://portal.etsi.org/tb.aspx?tbid=831andsubtbid= 831#/lt-5069-meetings [retrieved on Feb. 29, 2024] *the whole document*.

Anonymous, "Meetings of Supporting Material for NFV MANO New Enhancement Proposal Data Flow Mirroring", NFV IFA Contributions, Jun. 15, 2020 (Jun. 15, 2020), pp. 1-1, XP093136502, Retrieved from the Internet: https://portal.etsi.org/tb.aspx?TBID= 831&subTB=831#/50610-contributions [retrieved on Feb. 29, 2024]*the whole document*.

China Mobile Research Inst: "Supporting Material for NFV_ MANO New Enhancement Proposal Data Flow Mirroring", ETSI Draft; NFVIFA(20)000401R1, European Telecommunications Standards Institute (ETSI), 650, Route Des Lucioles ; F-06921 Sophia-Antipolis ; France, vol. WG NFV IFA Interfaces and Architecture, Jun. 9, 2020 (Jun. 9, 2020), pp. 1-11, XP014372341.

Naik Priyanka et al: "NFVPerf: Online performance monitoring and bottleneck detection for NFV", 2016 IEEE Conference on Network Function Virtualization and Software Defined Networks (NFV-SDN), IEEE, Nov. 7, 2016 (Nov. 7, 2016), pp. 154-160, XP033093241.

Extended European Search Report issued in corresponding European Application No. 21885018.8, dated Mar. 15, 2024, pp. 1-12.

* cited by examiner

Before improvement (a)

After improvement (b)

900

901

DATA FLOW MIRRORING METHOD AND APPARATUS

CROSS-REFERENCE TO RELATED APPLICATIONS

This application is a continuation of International Application No. PCT/CN2021/125202, filed on Oct. 21, 2021. The International Application claims priority to Chinese Patent Application No. 202011187447.6, filed on Oct. 29, 2020. The afore-mentioned patent applications are hereby incorporated by reference in their entirety.

TECHNICAL FIELD

This application relates to the field of NFV technologies, and in particular, to a data flow mirroring method and an apparatus.

BACKGROUND

Network function virtualization (network function virtualization, NFV) refers to the use of a common hardware device to carry functions of a dedicated device in a conventional network to reduce high costs caused during deployment of the dedicated device in combination with a virtualization technology. Software is not bound to dedicated hardware, so that a network device function no longer depends on the dedicated hardware. In addition, by virtue of characteristics of cloud computing, resources can be shared fully and flexibly to implement quick development and deployment of new services, and automatic deployment, scaling, fault isolation, self-healing, and the like are performed depending on actual service requirements. The NFV technology has gained great recognition in a data center (data center, DC) field, especially in a data center field of carriers, and has always been promoted by carriers.

Currently, a data flow mirroring service may be applied to a data center to mirror a specified data flow to obtain a mirrored data flow for further analysis. The data flow mirroring service plays a quite important role in many fields (for example, fields of service security risk insight and system security vulnerabilities).

However, how to implement a data flow mirroring service using an NFV architecture still needs to be further studied.

SUMMARY

In view of this, this application provides a data flow mirroring method and an apparatus, to implement an end-to-end (that is, from an OSS/BSS to a VIM) data flow mirroring service.

According to a first aspect, an embodiment of this application provides a data flow mirroring method. The method may be performed by an NFVO. In the method, the NFVO receives an instantiation request from an OSS/BSS, where the instantiation request requests to instantiate an NS; obtains NS description NSD information based on the instantiation request, where the NSD information includes first mirroring object information, the first mirroring object information describes information for creating a first mirroring object, and the first mirroring object is for mirroring a first data flow; and requests, based on the first mirroring object information, a virtualized infrastructure manager VIM to create the first mirroring object, where the first mirroring object is associated with a first mirroring service, and the first mirroring service is for analyzing a mirrored data flow of the first data flow.

According to the foregoing method, the current NSD information is extended, to include mirroring object information (optionally, the extended NSD information may further include mirroring service information). In this way, the data flow that needs to be mirrored can be specified in a design state, and a mirroring object (and a mirroring service) can be automatically created during NS deployment, thereby implementing an end-to-end (that is, from the OSS/BSS to the VIM) data flow mirroring service.

In a possible design, the first data flow is an inbound data flow to a first virtualized network function VNF included in the NS or an outbound data flow from the first VNF.

In a possible design, the NSD information further includes first mirroring service information, and the first mirroring service information describes information for creating the first mirroring service; and the method further includes: requesting, based on the first mirroring service information, the VIM to create the first mirroring service.

In a possible design, the first mirroring service information includes a name of the first mirroring service; and the requesting, based on the first mirroring service information, the VIM to create the first mirroring service includes: sending a query request to the VIM, where the query request includes the name of the first mirroring service; receiving a query response from the VIM, where the query response includes address information of an analysis system corresponding to the first mirroring service; and sending a first creation request to the VIM, where the first creation request requests to create the first mirroring service, and the first creation request includes the name of the first mirroring service and the address information of the analysis system corresponding to the first mirroring service.

According to the foregoing method, the NSD information may not include the address information of the analysis system corresponding to the first mirroring service, but the VIM allocates the address information of the analysis system corresponding to the first mirroring service. Therefore, security can be improved.

In a possible design, the first mirroring object information includes an identifier of an external connection point of the first VNF; and the requesting, based on the first mirroring object information, a VIM to create the first mirroring object includes: obtaining, from a VNFM based on the identifier of the external connection point, port information corresponding to the external connection point; and sending a second creation request to the VIM, where the second creation request requests to create the first mirroring object, and the second creation request includes the port information.

In a possible design, the first mirroring object information further includes mirroring position information. The method further includes: when the mirroring position information is a connection point, obtaining, from the VNFM, security group rule information corresponding to the external connection point, where the second creation request further includes the security group rule information, and the first data flow is a data flow that conforms to the security group rule information.

According to the foregoing method, considering that a security group rule may be defined for a connection point in VNFD information, in other words, only a data flow that meets a specific requirement can flow into or out of a specified connection point, when the mirroring position information is a connection point, the security group rule information may be obtained, so that a data flow to be mirrored is filtered based on the security group rule.

In a possible design, the method further includes: obtaining policy information, where the second creation request further includes the policy information, and the first data flow is a data flow that conforms to the policy information.

In a possible design, the method further includes: receiving a first update request from the OSS/BSS, where the first update request requests to update the first mirroring service to a second mirroring service, the first update request includes second mirroring service information, and the second mirroring service information describes information for creating the second mirroring service; requesting, according to the first update request, the VIM to delete the first mirroring service; and after it is determined that the VIM successfully deletes the first mirroring service, requesting, based on the second mirroring service information, the VIM to create the second mirroring service.

In a possible design, the method further includes: requesting, according to the first update request, the VIM to delete the first mirroring object associated with the first mirroring service; after it is determined that the VIM successfully deletes the first mirroring object, updating the first mirroring object information to second mirroring object information, where the second mirroring object information describes information for creating a second mirroring object, the second mirroring object is for mirroring the first data flow, and the second mirroring object is associated with the second mirroring service; and requesting, based on the second mirroring object information, the VIM to create the second mirroring object.

In a possible design, the method further includes: receiving a second update request from the OSS/BSS, where the second update request requests to add a third mirroring object, the second update request includes third mirroring object information, the third mirroring object information describes information for creating the third mirroring object, the third mirroring object is for mirroring a second data flow, and the third mirroring object is associated with the second mirroring service; and requesting, based on the third mirroring object information, the VIM to create the third mirroring object. Herein, the second data flow and the first data flow may be different data flows.

In a possible design, the method further includes: receiving a third update request from the OSS/BSS, where the third update request requests to update the first mirroring object to a fourth mirroring object, the third update request includes fourth mirroring object information, the fourth mirroring object information describes information for creating the fourth mirroring object, the fourth mirroring object is for mirroring a third data flow, and the fourth mirroring object is associated with the first mirroring service; requesting, according to the third update request, the VIM to delete the first mirroring object; and after it is determined that the VIM successfully deletes the first mirroring object, requesting, based on the fourth mirroring object information, the VIM to create the fourth mirroring object. Herein, the third data flow and the first data flow may be different data flows.

In a possible design, the method further includes: receiving a fourth update request from the OSS/BSS, where the fourth update request requests to add a fifth mirroring object, the fourth update request includes fifth mirroring object information, the fifth mirroring object information describes information for creating the fifth mirroring object, the fifth mirroring object is for mirroring a fourth data flow, and the fifth mirroring object is associated with the first mirroring service; and requesting, based on the fifth mirroring object information, the VIM to create the fifth mirroring object. Herein, the fourth data flow and the first data flow may be different data flows.

According to a second aspect, an embodiment of this application provides a data flow mirroring apparatus. The data flow mirroring apparatus may be an NFVO or a chip disposed inside an NFVO. The data flow mirroring apparatus has a function of implementing the first aspect. For example, the data flow mirroring apparatus includes a corresponding module, unit, or means (means) for performing the steps in the first aspect. The function, unit, or means may be implemented by using software, or may be implemented by using hardware, or may be implemented by hardware executing corresponding software.

In a possible implementation, the data flow mirroring apparatus includes a processing unit and a communication unit. The communication unit may be configured to receive and send signals to implement communication between the data flow mirroring apparatus and another apparatus. For example, the communication unit is configured to receive an instantiation request from an OSS/BSS. The processing unit may be configured to perform some internal operations of the data flow mirroring apparatus. Functions performed by the processing unit and the communication unit may be corresponding to the operations in the first aspect.

In a possible design, the data flow mirroring apparatus includes a processor, and may further include a transceiver. The transceiver is configured to receive and send signals, and the processor executes program instructions to complete the method according to any possible design or implementation of the first aspect. The data flow mirroring apparatus may further include one or more memories. The memory is coupled to the processor, and the memory may store a necessary computer program or instructions for implementing the function in the first aspect. The processor may execute the computer program or the instructions stored in the memory. When the computer program or the instructions are executed, the data flow mirroring apparatus is enabled to implement the method in any possible design or implementation of the first aspect.

In a possible design, the data flow mirroring apparatus includes a processor, and the processor may be configured to be coupled to a memory. The memory may store a necessary computer program or instructions for implementing the function in the first aspect. The processor may execute the computer program or the instructions stored in the memory. When the computer program or the instructions are executed, the data flow mirroring apparatus is enabled to implement the method in any possible design or implementation of the first aspect.

In a possible design, the data flow mirroring apparatus includes a processor and an interface circuit, and the processor is configured to: communicate with another apparatus by using the interface circuit, and perform the method in any possible design or implementation of the first aspect.

It may be understood that, in the second aspect, the processor may be implemented by using hardware or software. When the processor is implemented by using hardware, the processor may be a logic circuit, an integrated circuit, or the like. When the processor is implemented by using software, the processor may be a general-purpose processor, and is implemented by reading software code stored in the memory. In addition, there may be one or more processors and one or more memories. The memory may be integrated with the processor, or the memory and the processor are disposed separately. In a specific implementation process, the memory and the processor may be integrated into one chip, or may be disposed on different chips. A type of the memory and a manner in which the memory and the processor are disposed are not limited in embodiments of this application.

According to a third aspect, an embodiment of this application provides a data flow mirroring system. The system includes the data flow mirroring apparatus (for example, an NFVO) described in the second aspect, and may further include an OSS/BSS and a VIM. The OSS/BSS is configured to send an instantiation request to the NFVO, where the instantiation request requests to instantiate an NS. The NFVO is configured to: receive the instantiation request, and obtain NS description NSD information based on the instantiation request, where the NSD information includes first mirroring object information, the first mirroring object information describes information for creating a first mirroring object, and the first mirroring object is for mirroring a first data flow; and request, based on the first mirroring object information, the VIM to create the first mirroring object. The VIM is configured to create the first mirroring object, where the first mirroring object is associated with a first mirroring service, and the first mirroring service is for analyzing a mirrored data flow of the first data flow.

In a possible design, the OSS/BSS is further configured to upload the NSD information to the NFVO.

In a possible design, the NSD information further includes first mirroring service information, and the first mirroring service information describes information for creating the first mirroring service. The NFVO is further configured to request, based on the first mirroring service information, the VIM to create the first mirroring service. The VIM is further configured to create the first mirroring service.

According to a fourth aspect, this application provides a computer-readable storage medium. The storage medium stores a computer program. When the computer program is executed, the method in any possible design of the first aspect is implemented.

According to a fifth aspect, this application provides a computer program product. When a computer reads and executes the computer program product, the computer is enabled to perform the method according to any possible design of the first aspect.

These aspects or other aspects of this application are more readily apparent from the following description of embodiments.

DESCRIPTION OF EMBODIMENTS

The following describes technical solutions in embodiments of this application with reference to the accompanying drawings in embodiments of this application.

Figure 1:
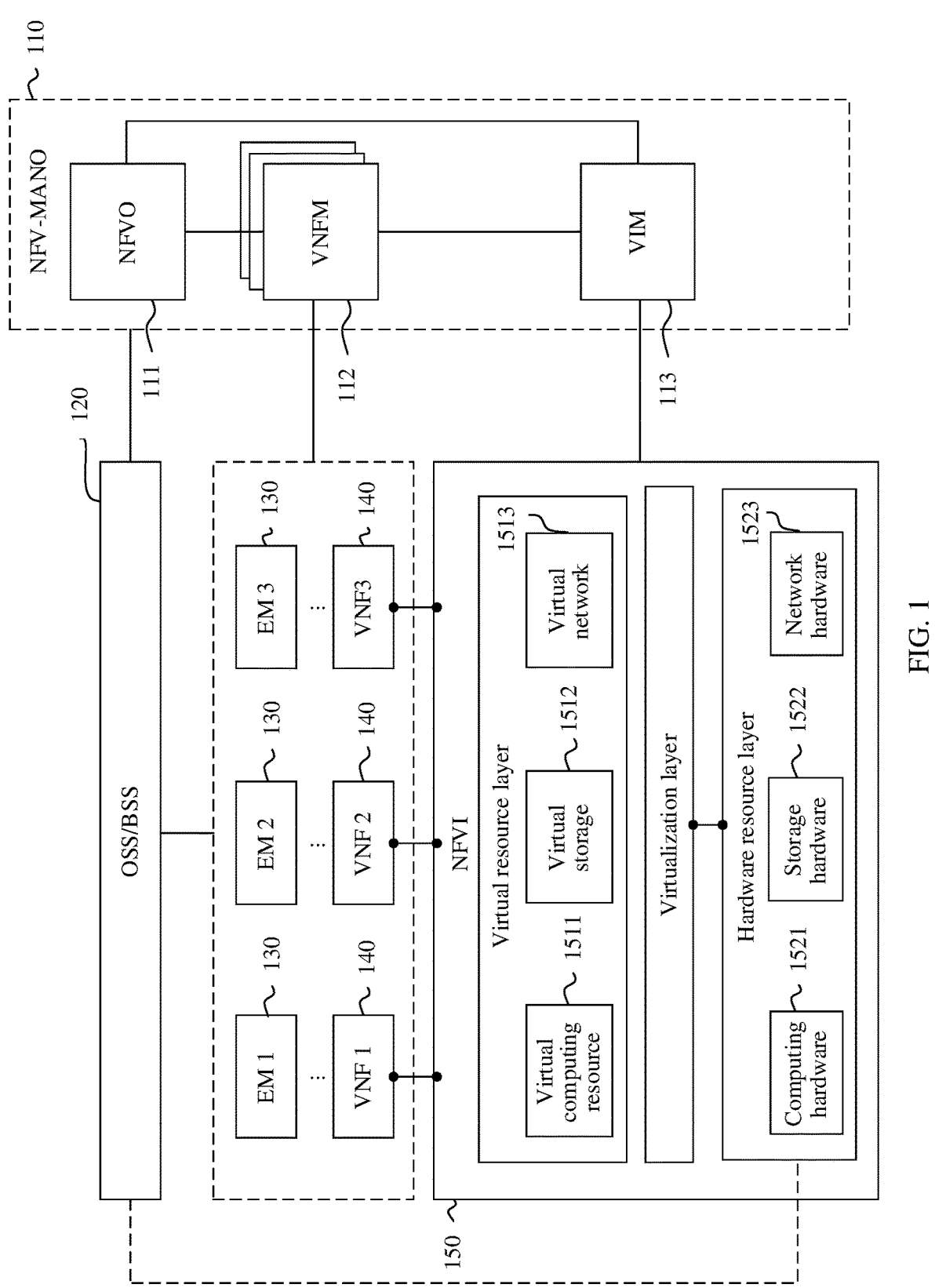
FIG. 1 is a schematic diagram of an NFV architecture according to an embodiment of this application.

FIG. 1 is a schematic diagram of an NFV architecture according to an embodiment of this application. The NFV architecture may implement a plurality of networks, for example, a local area network (local area network, LAN), an Internet Protocol (interne protocol, IP) network, or an evolved packet core (evolved packet core, EPC) network. As shown in FIG. 1, the NFV architecture may include an NFV management and orchestration system (NFV management and orchestration system, NFV-MANO) 110, an NFV infrastructure (NFV infrastructure, NFVI) 150, a plurality of virtualized network functions (virtualized network function, VNF) 140, a plurality of device management (element management, EM) modules 130, and one or more operation support systems/business support systems (operation support system/business support system, OSS/BSS) 120. The NFV-MANO 110 may include an NFV orchestrator (NFV orchestrator, NFVO) 111, one or more VNF managers (VNF manager, VNFM) 112, and one or more VIMs 113.

The following separately describes parts included in the NFV architecture.

(1) The NFVO 111 is mainly responsible for processing life cycle management in a virtualization service, allocating and scheduling virtual resources in a virtual infrastructure and the NFVI, and the like. The NFVO 111 may communicate with one or more VNFMs 112 to execute a resource-related request, send configuration information to the VNFM 104, and collect status information of the VNF 140. In addition, the NFVO 111 may also communicate with the VIM 113 to perform resource allocation and/or reservation and exchange a configuration and status information of a virtualized hardware resource.

(2) The VNFM 112 is mainly responsible for life cycle management of one or more VNFs, for example, instantiating (instantiating) the VNF 140, updating (updating) the VNF 140, querying the VNF 140, scaling (scaling) the VNF 140, and terminating (terminating) the VNF 140. The VNFM 112 may communicate with the VNF 140 to complete life cycle management and configuration and status information exchanging of the VNF. In the NFV architecture, there may be a plurality of VNFMs, responsible for performing life cycle management of different types of VNFs.

(3) The VIM 113 is mainly responsible for controlling and managing interaction between the VNF 140 and computing hardware 1521, storage hardware 1522, network hardware 1523, a virtual computing resource 1511 (for example, a virtual machine (virtual machine, VM)), a virtual storage 1512, and a virtual network 1513. For example, the VIM 113 performs a resource management function, including management of an infrastructure resource, allocation (for example, adding a resource to a virtual container), and function running (for example, collecting NFVI fault information). The VNFM 112 may communicate with the VIM 113 to request to perform resource allocation and exchange a configuration and status information of a virtualized hardware resource.

(4) The NFVI 150 may include a hardware resource layer including the computing hardware 1521, the storage hardware 1522, and the network hardware 1523, a virtualization layer, and a virtual resource layer including the virtual computing resource 1511, the virtual storage 1512, and the virtual network 1513. The computing hardware 1521 at the hardware resource layer may be a dedicated processor, or a general-purpose processor configured to provide processing and computing functions, for example, a central processing unit (central processing unit, CPU). The storage hardware 1522 is configured to provide a storage capability, for example, a magnetic disk or a network attached storage (network attached storage, NAS). The network hardware 1523 may be a switch, a router, and/or another network device. The virtualization layer in the NFVI 150 is configured to abstract a hardware resource at the hardware resource layer to decouple the VNF 140 from a physical layer to which the hardware resource belongs, to provide a virtual resource to the VNF. The virtual resource layer may include the virtual computing resource 1511, the virtual storage 1512, and the virtual network 1513. The virtual computing resource 1511 and the virtual storage 1512 each may be provided to the VNF 140 in a form of a virtual machine or another virtual container. For example, one or more virtual machines form one VNF 140. The virtualization layer forms the virtual network 1513 by abstracting the network hardware 1523. The virtual network 1513 is configured to implement communication between a plurality of virtual machines or a plurality of virtual containers of another type that bear the VNF.

(5) The EM 130 is a system for configuring and managing a device in a conventional telecommunication system. In the NFV architecture, the EM 130 may also be configured to configure and manage the VNF, and initiate a life cycle management operation such as instantiation of a new VNF to the VNFM 112.

(6) The OSS/BSS 120 supports various end-to-end telecommunication services. For example, management functions supported by the OSS include network configuration, service provision, and fault management; and the BSS performs order, payment, and revenue processing and supports product management, order management, revenue management, and customer management.

(7) The VNF 140 is corresponding to a physical network function (physical network function, PNF) in a conventional non-virtualized network, for example, a virtualized packet core (evolved packet core, EPC) node (for example, a mobility management entity (mobility management entity, MME), a serving gateway (serving gateway, SGW), or a public data network gateway (public data network gateway, PGW)). Functional behavior and a status of a network function are unrelated to whether the network function is virtualized. In an NFV technical requirement, it is expected that the VNF and the PNF have same functional behavior and a same external interface.

Figure 2:
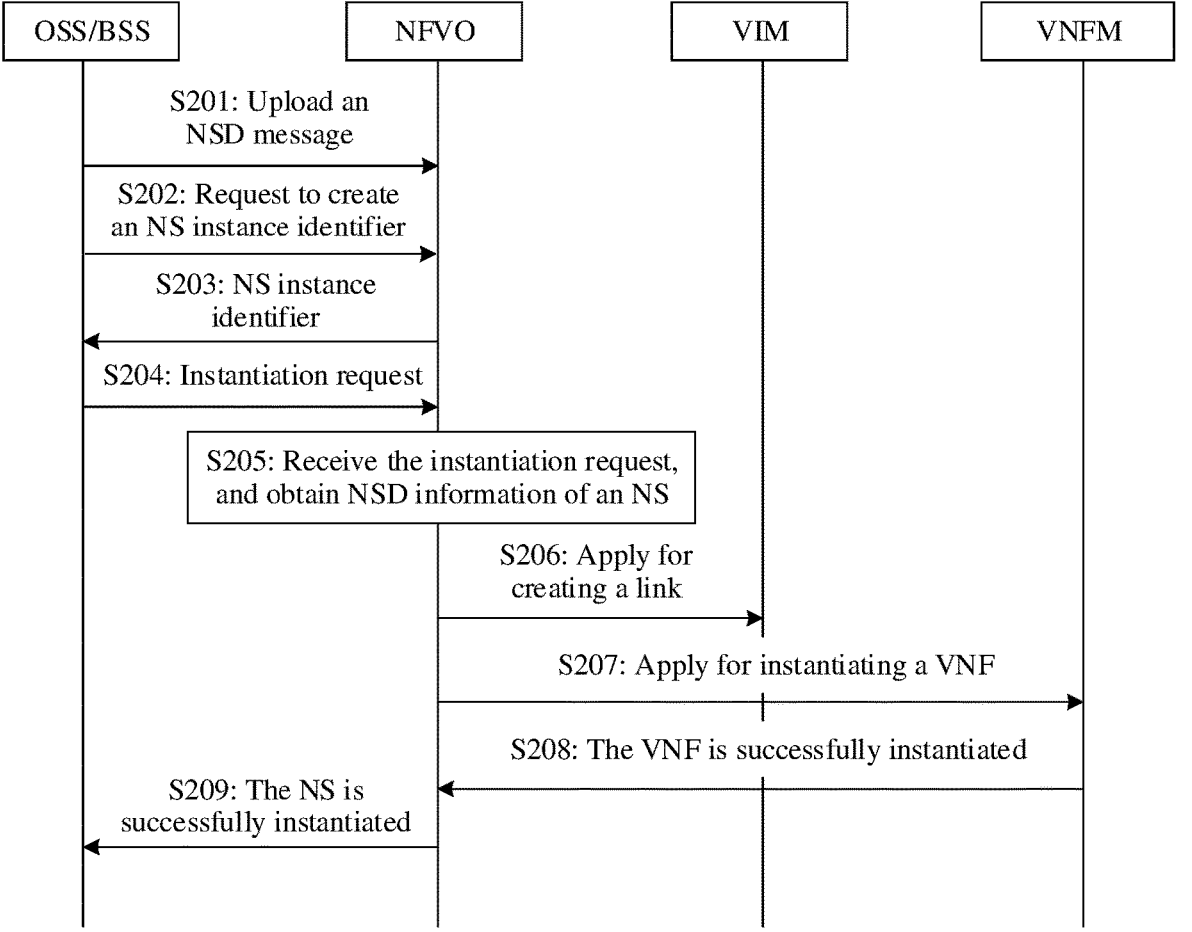
FIG. 2 is a schematic flowchart of instantiating an NS according to an embodiment of this application.

Based on the NFV architecture shown in FIG. 1, FIG. 2 is a schematic flowchart of instantiating a network service (network service, NS). The NS may be, for example, an EPC network service, and one NS may include several VNFs that are also referred to as virtualized network elements. As shown in FIG. 2, a procedure may include the following steps.

S201: An OSS/BSS uploads pre-designed description (network service descriptor, NSD) information of the NS to an NFVO.

For example, the NSD information may also be referred to as an NS deployment template. The NSD information may include an NSD identifier (NSD ID), topology structure information for describing the NS, and description (VNF descriptor, VNFD) information of each VNF included in the NS. In the topology structure information, NS virtual link descriptor (network service virtual link descriptor, NSVLD) information (or referred to as VLD information for short) may be for describing a virtual link (virtual link, VL) between VNFs. The VNFD information may also be referred to as a VNF deployment template. A quantity of pieces of VNFD information included in the NSD information is the same as a quantity of the VNFs included in the NS, in other words, each VNF is corresponding to one VNFD. Each VNFD describes information about a VNF corresponding to the VNFD. Each VNF includes one or more virtualisation deployment units (virtualisation deployment unit, VDU). Therefore, VNFD information corresponding to each VNF may include information about one or more VDUs. Information about one VDU may include resource information of at least one VM forming the VDU. For example, resource information of each VM may include a central processing unit (central processing unit, CPU) quantity, CPU performance, a memory size, bandwidth, a storage size, and other information of the VM.

To describe the VLD information included in the NSD information more clearly, the following provides description with reference to two examples.

Figure 3:
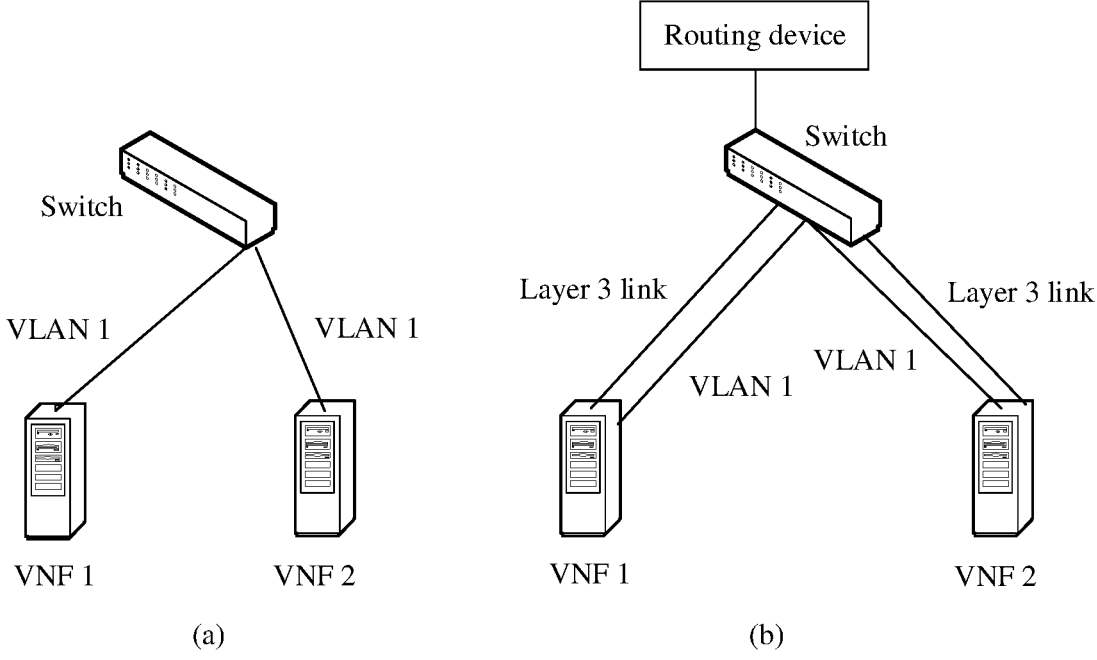
FIG. 3 is a diagram of two examples in which an NS includes two VNFs according to an embodiment of this application.

In Example 1, as shown in (a) in FIG. 3, the NS includes two VNFs deployed on a same rack in a data center: a VNF 1 and a VNF 2. The VNF 1 and the VNF 2 communicate with each other via a switch (which may be a virtual switch or may be a physical switch), in other words, the VNF 1 and the VNF 2 communicate with each other over a virtual local area network (virtual local area network, VLAN). For ease of description, the VLAN may be marked as VLAN 1. In this case, the NSD information of the NS includes VNFD information 1 corresponding to the VNF 1, VNFD information 2 corresponding to the VNF 2, and VLD information corresponding to the VNF 1 and the VNF 2. The VLD information may include information about a VLAN (that is, the VLAN 1) between the VNF 1 and the VNF 2. Alternatively, because the VNF 1 and the VNF 2 are connected to a same VLAN, the VNF 1 and the VNF 2 may communicate with each other over a layer 2 link. In this case, the VLD information may also include information about the layer 2 link in the VLAN 1.

As shown in (b) in FIG. 3, different from Example 1, in Example 2, an upper-layer routing device of a switch connected to the VNF 1 and the VNF 2 may further allocate a layer 3 link to the VNF 1 and the VNF 2. In this way, the VNF 1 and a VNF 3 may further communicate with each other based on the layer 3 link allocated by the upper-layer routing device. Therefore, the VLD information may also include information about the layer 3 link allocated to the VNF 1 and the VNF 2 by the upper-layer routing device.

The OSS/BSS sends, to the NFVO, a request message for requesting to create an NS instance identifier, where the request message may include the NSD identifier of the NS.

S203: The NFVO returns a response message to the OSS/BSS, where the response message includes the NS instance identifier corresponding to the NSD identifier.

S204: The OSS/BSS sends an instantiation request to the NFVO, where the instantiation request requests to instantiate the NS, and the instantiation request may include the NS instance identifier.

S205: The NFVO receives the instantiation request, and obtains the NSD information of the NS based on the NS instance identifier in the instantiation request and a correspondence between the NS instance identifier and the NSD identifier.

S206: The NFVO applies, based on VLD information in the NSD information, to a VIM for creating a virtual link.

For example, if the VLD information includes only a layer 2 link, the NFVO applies to the VIM for creating only the layer 2 link; and if the VLD information further includes a layer 3 link, the NFVO further needs to create the layer 3 link after creating the layer 2 link.

S207: The NFVO applies, based on the VNFD information in the NSD information, to a VNFM for instantiating a VNF.

Herein, the NFVO may send a VNF instantiation request to the VNFM. The VNF instantiation request may include an identifier of a VNF that needs to be instantiated and information about a layer 2 link and/or a layer 3 link connected to each VNF.

S208: The VNFM completes an instantiation process of the VNF, and feeds back, to the NFVO, a message indicating that the VNF is successfully instantiated.

Herein, after obtaining the VNF instantiation request, the VNFM applies for a virtual machine resource, a storage resource, a network resource, and the like for each VNF based on a VNFD corresponding to each VNF identifier, and completes a connection between the VNF and a layer 2 link and/or a layer 3 link based on information about the layer 2 link and/or the layer 3 link connected to the VNF, to complete an instantiation process of the VNF; and then feeds back, to the NFVO, a message indicating that the VNF is successfully instantiated.

S209: The NFVO feeds back, to the OSS/BSS, a message indicating that the NS is successfully instantiated.

Herein, after receiving the message that is sent by the VNFM and that indicates that the VNF is successfully instantiated, the NFVO confirms that an instantiation process of the NS is completed, to feed back, to the OSS/BSS, the message indicating that the NS is successfully instantiated.

Figure 4:
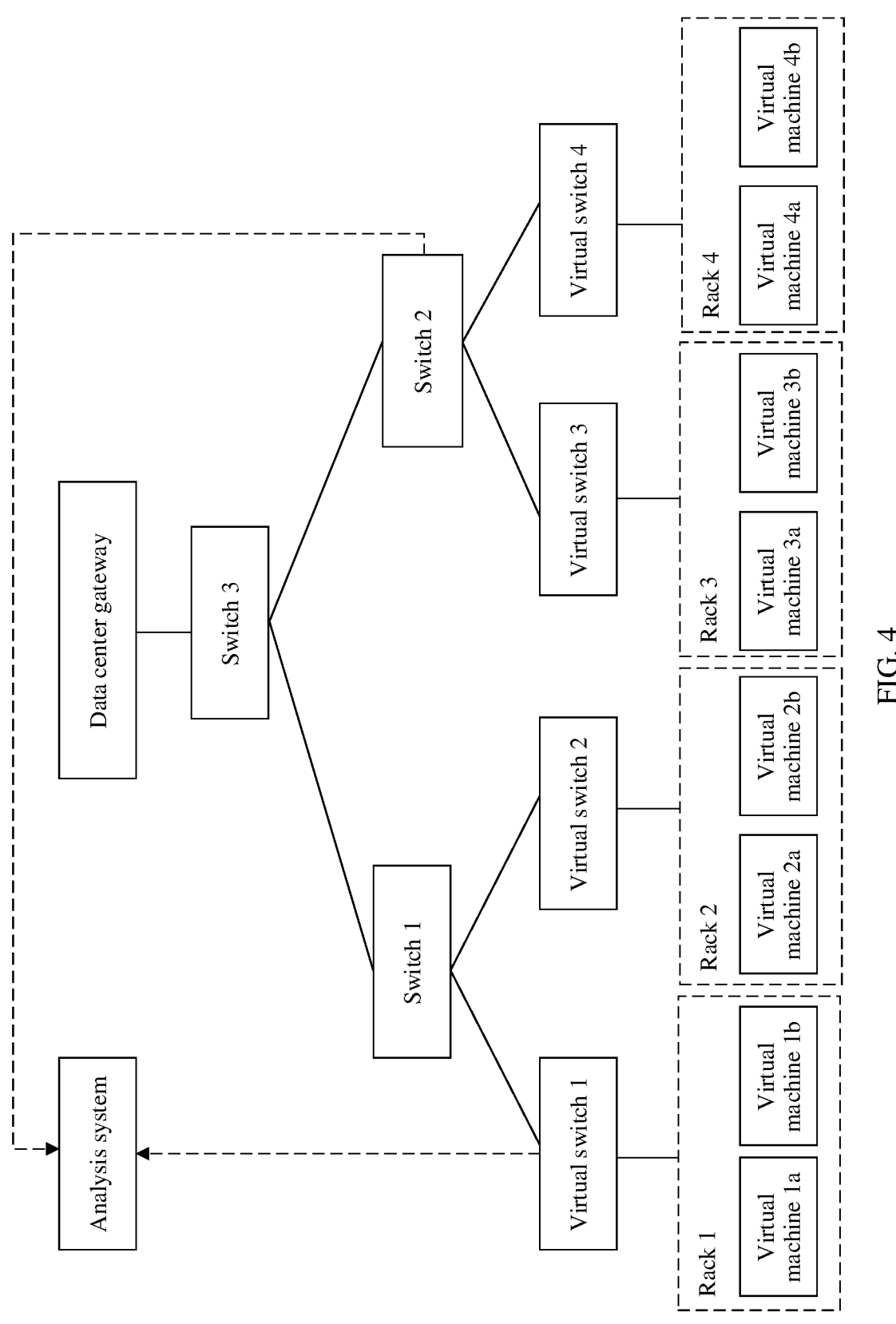
FIG. 4 is an example diagram of deploying a data flow mirroring service in a data center according to an embodiment of this application.

FIG. 4 is an example diagram of deploying a data flow mirroring service in a data center according to an embodiment of this application. As shown in FIG. 4, the data center includes a plurality of virtual machines (for example, a virtual machine 1a, a virtual machine 1b, . . . , a virtual machine 4a, and a virtual machine 4b), a plurality of virtual switches (virtual switch) (for example, a virtual switch 1, a virtual switch 2, . . . , and a virtual switch 4), a plurality of switches (for example, a switch 1, a switch 2, and a switch 3), a data center gateway, and the like. The plurality of virtual machines may be deployed on different servers. For example, the virtual machine 1a and the virtual machine 1b are deployed on a server of a rack 1, the virtual machine 2a and the virtual machine 2b are deployed on a server of a rack 2, the virtual machine 3a and the virtual machine 3b are deployed on a server of a rack 3, and the virtual machine 4a and the virtual machine 4b are deployed on a server of a rack 4. The virtual switch is configured to provide a network service to a virtual machine. For example, the virtual switch 1 is configured to provide a network service to the virtual machine 1a and the virtual machine 1b, the virtual switch 2 is configured to provide a network service to the virtual machine 2a and the virtual machine 2b, the virtual switch 3 is configured to provide a network service to the virtual machine 3a and the virtual machine 3b, and the virtual switch 4 is configured to provide a network service to the virtual machine 4a and the virtual machine 4b. The switch is configured to connect servers on different racks. For example, the switch 1 is configured to connect servers on the rack 1 and the rack 2, and the switch 2 is configured to connect servers on the rack 3 and the rack 4. In specific implementation, the data center may include a plurality of layers of switches. The data center gateway may be an egress gateway device of the data center. Further, an analysis system may be deployed in the data center, and is configured to analyze a received mirrored data flow (for example, a mirrored data flow of a data flow to/from a virtual machine, a data flow in a virtual switch, or a mirrored data flow of a data flow in a switch). For example, the analysis system may analyze a flow rate and a type of the mirrored data flow. This is not specifically limited. For example, in this embodiment of this application, a deployment position of the analysis system in the data center may not be limited. A communication interface may be disposed between the analysis system and a virtual switch, or a communication interface may be disposed between the analysis system and a switch. This is not specifically limited.

Based on the example diagram described in FIG. 4, the following describes a possible implementation of the data flow mirroring service. Specifically, in the data center, there may be a plurality of platforms for managing a virtual resource. Using OpenStack as an example, to implement a data flow mirroring service, OpenStack defines a tapflow (or dataflow) and a tapservice (or dataservice) for data flow mirroring management. The tapflow is for mirroring a data flow to obtain a mirrored data flow. For example, tapflow information describes information for creating a tapflow. For example, the tapflow information may include a name of the tapflow, a name of a tapservice associated with the tapflow, and information that is used to specify a data flow that needs to be mirrored (for example, port information of a virtual machine and flow direction information). The tapservice is for analyzing a mirrored data flow. For example, tapservice information may include address information of an analysis system, and the address information of the analysis system may include IP address information or port (port) information of a virtual machine (that is, Analysis VM) on which the analysis system is located. By defining the tapflow and the tapservice, a mirrored data flow of a specified data flow may be analyzed.

For example, if an inbound data flow to a virtual machine 1 needs to be mirrored, the tapflow may be defined as follows:

```
{id: flow123,
 name: flow_1,
 tapservice_id: service123, # defines tapservice# associated
 with the tapflow
```

-continued

```
    source_port: VM 1-port,
    position: PORT,
    direction: In};
``` and
the tapservice may be defined as follows:

```
        {id: service123,
        name: service_1,
        port_id: Analysis_VM-port}.
```

For the tapflow, port information of the virtual machine (that is, VM1-port), mirroring position information (that is, PORT), and a direction (that is, In) of the data flow passing through the port are defined. For the tapservice associated with the tapflow, port information of a virtual machine on which an analysis system is located (that is, Analysis VM-port) is defined. Therefore, by defining the tapflow and the tapservice associated with the tapflow, a mirrored data flow of the inbound data flow to the virtual machine 1 can be transmitted to the analysis system for analysis.

It can be learned from the foregoing content that, most of information that is related to a current operation interface that is defined by OpenStack and that is used to implement data flow mirroring is instantiation information (that is, information in a deployment state), for example, port information of a virtual machine. Therefore, the information is usually used for transmission between an NFVO and a VIM. For example, after an NS is instantiated by using the NS instantiation procedure shown in FIG. 2, if an inbound data flow to the virtual machine 1 needs to be mirrored, the NFVO may send the tapflow information and the tapservice information to the VIM, so that the VIM can mirror, based on the tapflow information and the tapservice information, the inbound data flow to the virtual machine 1. In other words, in the foregoing implementation, the data flow mirroring service is mainly implemented in a deployment state, but a data flow that needs to be mirrored cannot be specified in a design state (NSD design), in other words, there is no end-to-end (that is, from an OSS/BSS to a VIM) solution for implementing a data flow mirroring service.

Based on this, an embodiment of this application provides a data flow mirroring method, to implement an end-to-end (that is, from an OSS/BSS to a VIM) data flow mirroring service. For example, in the method provided in this embodiment of this application, NSD information may be improved. For example, a data flow that needs to be mirrored may be specified in the NSD information, to implement an end-to-end data flow mirroring service.

It is to be noted that NS instantiation and a service scenario described in this embodiment of this application are intended to describe technical solutions in embodiments of this application more clearly, and do not constitute any limitation on the technical solutions provided in embodiments of this application. A person of ordinary skill in the art may know that, with evolution of a network architecture and emergence of a new service scenario, the technical solutions provided in embodiments of this application are also applicable to a similar technical problem.

The technical solutions provided in embodiments of this application are described below in detail with reference to the accompanying drawings.

As described above, in this embodiment of this application, the NSD information may be improved. The following describes specific implementation of improving the NSD information with reference to a specific example.

Figure 5:
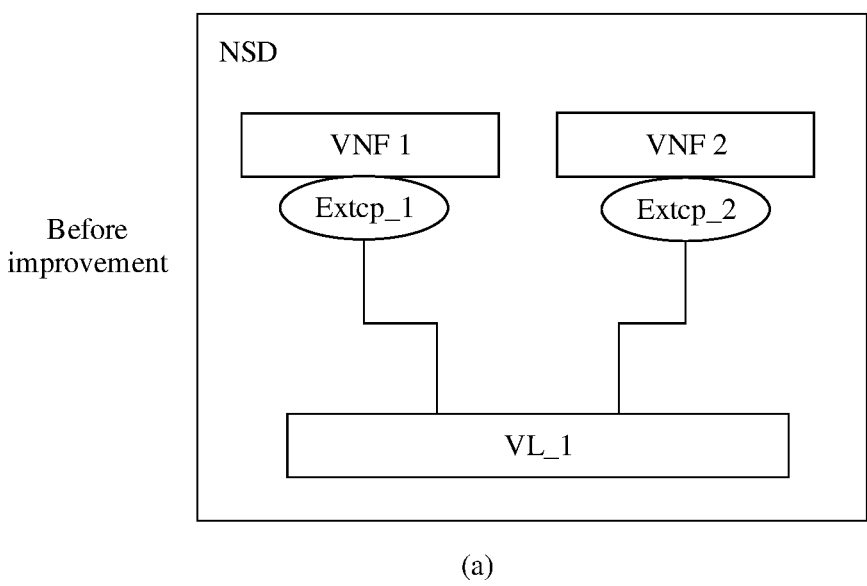
FIG. 5 is an example diagram of an NSD model before improvement and an improved NSD model according to an embodiment of this application.
Figure 5:
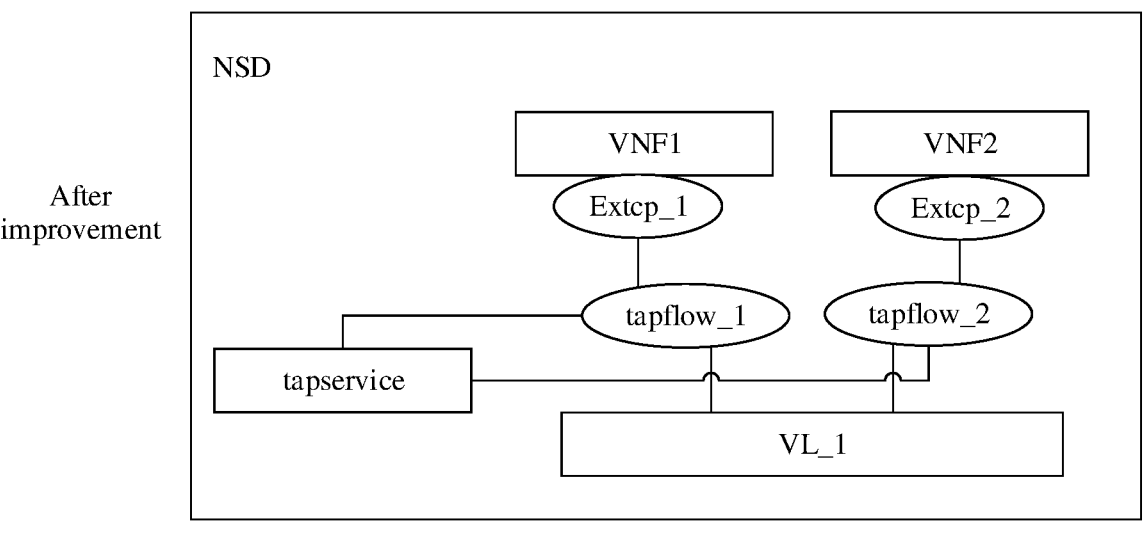

(1) NSD Information Before Improvement (a) in FIG. 5 is an example diagram of an NSD model before improvement. The NSD model before improvement includes a VNF 1, a VNF 2, and VL_1 between the VNF 1 and the VNF 2. The VNF 1 is connected to VL_1 via an external connection point (Extcp) (for example, Extcp_1) of the VNF 1, and the VNF 2 is connected to VL_1 via an external connection point (for example, Extcp_2) of the VNF 2. For the NSD model, the corresponding NSD information may include VNFD information corresponding to the VNF 1, VNFD information corresponding to the VNF 2, and description information (that is, VLD information) of VL_1 between the VNF 1 and the VNF 2.

For example, the NSD information may further include NsVirtualLinkConnectivity information for describing a connection between a VNF (that is, the VNF 1 and the VNF 2) included in the NS and VL_1. The connection may be understood as a connection relationship between the VNF included in the NS and a layer 2 link and/or a layer 3 link. For example, the connection relationship between the VNF included in the NS and the layer 2 link and/or the layer 3 link includes an identifier of an external connection point of the VNF and information about the layer 2 link and/or the layer 3 link connected to the external connection point. In the following, a standard defined by the European Telecommunications Standards Institute (European telecommunications standards institute, ETSI) for an NFV technology is used as an example to describe content included in the NsVirtualLinkConnectivity information. Refer to Table 1. Table 1 includes two pieces of attribute information: virtualLinkConnectionInfo and constituentCpdId. virtualLinkConnectionInfo indicates information about VL_1, that is, information about the layer 2 link and/or the layer 3 link, and constituentCpdId indicates information about the external connection point (which may be marked as VnfExtCp) of the VNF.

TABLE 1

| Example of the content included in the NsVirtualLinkConnectivity information | | |
| --- | --- | --- |
| Attribute (Attribute) | Candidate value (Cardinality) | Description (Description) |
| virtualLinkConnectionInfo | 1 | Indicates a VL file |
| constituentCpdId | 1, . . . , and N | Describes a CP on the VNF |

A candidate value of virtualLinkConnectionInfo is 1, and this indicates that the VNF is connected to one VL. virtualLinkConnectionInfo may include an identifier (identifier, Id) of a VL file (virtualLinkProfile) (for example, the identifier may be an identifier of the foregoing VLD information). constituentCpdId indicates an identifier of the CP connected to the VL, and the CP may be an external connection point of the VNF.

(2) Improved NSD Information (b) in FIG. 5 is an example diagram of an improved NSD model. Compared with the NSD model before improvement, in the improved NSD model, the VNF 1, the VNF 2, and VL_1 remain unchanged, and two model nodes are added:

a tapflow (for example, tapflow_1 and tapflow_2) and a tapservice. The tapflow is defined at a position at which mirroring is to be performed. For example, tapflow_1 is defined between ExtCp 1 of the VNF 1 and VL_1, and is for mirroring a data flow from the VNF 1 to VL_1 or a data flow from VL_1 to the VNF 1; and tapflow_2 is defined between ExtCp 2 of the VNF 2 and VL_1, and is for mirroring a data flow from the VNF 2 to VL_1 or a data flow from VL_1 to the VNF 2. For the NSD model, the corresponding NSD information may include the VNFD information corresponding to the VNF 1, the VNFD information corresponding to the VNF 2, and the description information of VL_1 between the VNF 1 and the VNF 2, and may further include mirroring object information and mirroring service information.

For example, the mirroring object information may be tapflow information, and describes information for creating a mirroring object (or a tapflow). The mirroring object may be for mirroring a specified data flow. Creating the mirroring object may be understood as creating a task or a process by the VIM. One mirroring object may be associated with one mirroring service. The mirroring service information may be tapservice information, and describes information for creating a mirroring service (or a tapservice). The mirroring service is for analyzing a mirrored data flow of a data flow indicated by a mirroring object associated with the mirroring service. Creating the mirroring service may be understood as creating a task or a process by the VIM. One mirroring service may be associated with one or more mirroring objects. In this embodiment of this application, an example in which the mirroring object is a tapflow and the mirroring service is a tapservice is used for description.

In a possible case (referred to as Case 1), the NSD information may include tapflow information and tapservice information. In this case, the tapflow information may include at least one of the following: a name of the tapflow, flow direction information of a data flow, a name of the associated tapservice, policy information, mirroring position information, and an identifier of an external connection point. The tapservice information may include at least one of the following: the name of the tapservice and address information of an analysis system corresponding to the tapservice.

Table 2 shows an example of content included in the tapflow information.

TABLE 2

| Example of content included in the tapflow information | | |
| --- | --- | --- |
| Parameter name | Value | Description |
| tapflow name (tapflow_name) | | Name of a tapflow that needs to be created |
| Flow direction information (direction) | Flow in (In), flow out (out), and all (all) | Flow direction of a data flow that needs to be mirrored |
| tapservice name (tapservice_name) | | Name of the associated tapservice |
| Policy information (flow_policy) | | For example, the policy information may define a source (source) IP and/or a destination (end) IP to mirror a specific IP data flow. |
| Mirroring position information (position) | CP and VL | Describes whether a data flow is mirrored from the CP or a data flow is mirrored from a VL connected to the CP |

TABLE 2-continued

| Example of content included in the tapflow information | | |
| --- | --- | --- |
| Parameter name | Value | Description |
| CP identifier (CpdId) | | Describes a CP associated with the tapflow that needs to be created, which may be an external connection point of the VNF |

It is to be noted that in this embodiment of this application, there may be a plurality of values of the mirroring position information, for example, the CP or the VL listed in Table 2. When a value of the mirroring position information is a CP (the CP herein may be the external connection point of the VNF), it indicates that the tapflow information indicates to mirror a data flow from the CP. In this case, because a security group rule may be defined for the CP in a VNFD file (that is, only a data flow that meets a specific requirement can flow into or out of the CP), when the value of the mirroring position information is the CP, the data flow to be mirrored needs to be filtered according to the security group rule. When a value of the mirroring position information is a VL, it indicates that the tapflow information indicates to mirror a data flow from the VL connected to the CP. In this case, because a security group rule cannot be defined for the VL, the security group rule may not be considered.

Table 3 shows an example of content included in the tapservice information.

TABLE 3

| Example of the content included in the tapservice information | | |
| --- | --- | --- |
| Parameter name | Value | Description |
| tapservice name (tapservice_name) | | Name of a tapservice that needs to be created |
| Address information (address_info) | | Describes address information of an analysis system corresponding to the tapservice |

In another possible case (referred to as Case 2), if the tapservice associated with the tapflow is a created tapservice, for example, may be a tapservice created during instantiation of another NS, the NSD information may include tapflow information, but does not include tapservice information. In this case, the tapflow information may include at least one of the following: a name of the tapflow, flow direction information, an identifier of the associated tapservice, policy information, mirroring position information, and an identifier of an external connection point.

For the foregoing two possible cases, in a possible implementation, the tapflow information in an NSD may be included in the NsVirtualLinkConnectivity information. In other words, the NsVirtualLinkConnectivity information may be extended. Table 4 shows an example of content included in extended NsVirtualLinkConnectivity information.

TABLE 4

| | Candidate value | Description |
| Attribute (Attribute) | (Cardinality) | (Description) |
|---|---|---|
| virtualLinkConnectionInfo | 1 | Indicates a VL file |
| constituentCpdId | 1, . . . , and N | Describes a CP on the VNF |
| tapflow | 0, . . . , and N | Describes a data flow that needs to be mirrored between the VNF and the VL |

Example of the content included in the extended NsVirtualLinkConnectivity information It is to be noted that, in Table 4, a value of the tapflow may be 0, . . . , and N. When the value of the tapflow is 0, it indicates that no data flow that needs to be mirrored exists between the VNF and the VL. When the value of the tapflow is N, it indicates that one or more tapflows may be created for the VNF and the VL.

Based on the foregoing description of the improved NSD information, the following describes a procedure of the data flow mirroring method provided in the embodiment of this application.

In the following description process, an example in which the method is applied to the NFV architecture shown in FIG. 1 is used. In other words, in the following, an OSS/BSS may be the OSS/BSS 120 shown in FIG. 1, an NFVO may be the NFVO 111 shown in FIG. 1, and a VIM may be the VIM 113 shown in FIG. 1.

Embodiment 1

Figure 6:
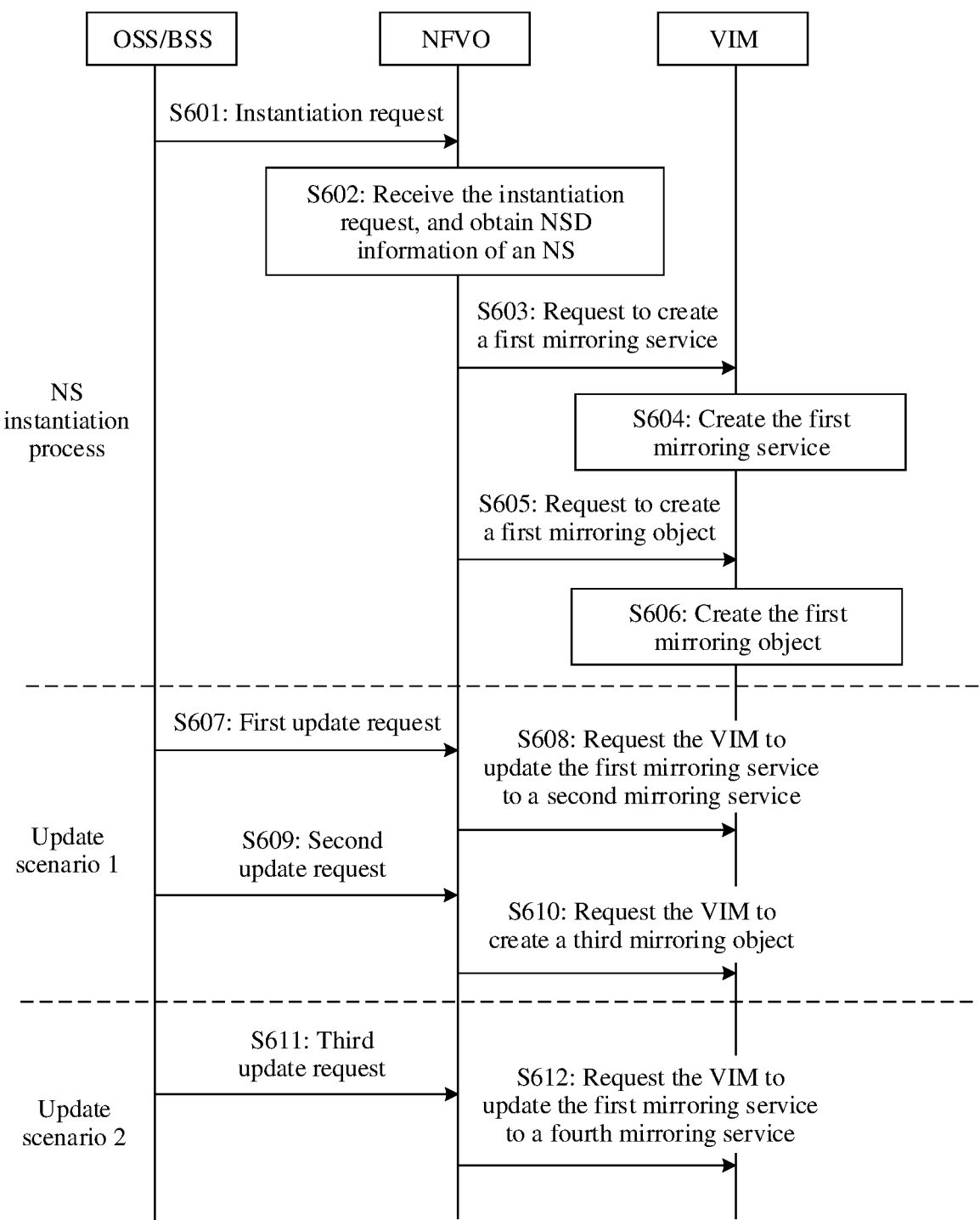
FIG. 6 is a schematic flowchart corresponding to a data flow mirroring method according to Embodiment 1 of this application.

FIG. 6 is a schematic flowchart corresponding to a data flow mirroring method according to Embodiment 1 of this application. As shown in FIG. 6, the method includes the following steps.

S601: An OSS/BSS sends an instantiation request to an NFVO, where the instantiation request requests to instantiate an NS, and the instantiation request may include an NS instance identifier.

S602: The NFVO receives the instantiation request, and obtains NSD information of the NS based on the NS instance identifier in the instantiation request.

Herein, the NSD information may include first mirroring object information, the first mirroring object information describes information for creating a first mirroring object, the first mirroring object is for mirroring a first data flow, and the first mirroring object may be associated with a first mirroring service.

For example, if the first mirroring service is a mirroring service that has not been created, the NSD information may further include first mirroring service information (corresponding to the foregoing Case 1). The first mirroring service information describes information for creating the first mirroring service. In this case, S603 and S604 may be performed. If the first mirroring service is a created mirroring service, the NSD information may not include the first mirroring service information (corresponding to the foregoing Case 2). In this case, S603 and S604 may not be performed.

In this embodiment of this application, after obtaining the NSD information of the NS, the NFVO may instantiate the NS based on the NSD information. NS instantiation may include S603 to S606, and may further include processes such as virtual link creation and VNF instantiation.

S603: The NFVO requests, based on the first mirroring service information, a VIM to create the first mirroring service.

S604: The VIM creates the first mirroring service according to the request from the NFVO.

In an example, the first mirroring service information may include a name of the first mirroring service and address information of an analysis system corresponding to the first mirroring service. In this case, the NFVO may send a first creation request to the VIM, where the first creation request includes the name of the first mirroring service and the address information of the analysis system corresponding to the first mirroring service. Further, the VIM may create the first mirroring service according to the first creation request.

In another example, the first mirroring service information may include the name of the first mirroring service, but does not include the address information of the analysis system corresponding to the first mirroring service. In this case, in a possible implementation, the NFVO may send a query request to the VIM, where the query request includes the name of the first mirroring service; after receiving the query request, the VIM may allocate a corresponding analysis system to the first mirroring service based on the query request, and return a query response to the NFVO, where the query response includes address information of the analysis system corresponding to the first mirroring service; after receiving the query response, the NFVO may send a first creation request to the VIM, where the first creation request includes the name of the first mirroring service and the address information of the analysis system corresponding to the first mirroring service; and further the VIM may create the first mirroring service according to the first creation request. In another possible implementation, the NFVO may send a first creation request to the VIM, where the first creation request includes the name of the first mirroring service; and after receiving the first creation request, the VIM may allocate a corresponding analysis system to the first mirroring service based on the first creation request, and create the first mirroring service based on the name of the first mirroring service and address information of the analysis system corresponding to the first mirroring service. In the foregoing two implementations, the NSD information may not include the address information of the analysis system corresponding to the first mirroring service, but the VIM allocates the address information of the analysis system corresponding to the first mirroring service. Therefore, security can be improved. In still another possible implementation, the instantiation request carries address information of an analysis system corresponding to the first mirroring service, so that the NFVO may obtain, from the instantiation request, the address information of the analysis system corresponding to the first mirroring service, and send a first creation request to the VIM, where the first creation request includes the name of the first mirroring service and the address information of the analysis system corresponding to the first mirroring service; and further the VIM may create the first mirroring service according to the first creation request.

In addition, in the foregoing two examples, after creating the first mirroring service according to the first creation request, the VIM may send a first creation response to the NFVO. The first creation response indicates that the first mirroring service is successfully created, and the first creation response may include an identifier allocated by the VIM to the first mirroring service.

S605: The NFVO requests, based on the first mirroring object information, the VIM to create the first mirroring object.

S606: The VIM creates the first mirroring object according to the request from the NFVO.

For example, the first data flow is an inbound data flow to a first VNF included in the NS or an outbound data flow from the first VNF. The first mirroring object information may include a name of the first mirroring object, the name (or an identifier) of the first mirroring service associated with the first mirroring object, and information (for example, flow direction information, policy information, and an identifier of an external connection point of the first VNF) used to specify the first data flow. Optionally, the first mirroring object information may further include mirroring position information. It is to be noted that, when the NSD information does not include the first mirroring service information (it indicates that the first mirroring service is a created mirroring service), the first mirroring object information may include the identifier of the first mirroring service associated with the first mirroring object. When the NSD information includes the first mirroring service information (it indicates that the first mirroring service is a mirroring service that has not been created, and in this case, the VIM has not allocated an identifier to the first mirroring service), the first mirroring object information may include the name of the first mirroring service associated with the first mirroring object.

The NFVO may obtain, from a VNFM based on an identifier of an external connection point, port information corresponding to the external connection point. In addition, when the mirroring position information is a CP, the NFVO may obtain, from the VNFM, security group rule information corresponding to the external connection point of the first VNF. Further, the NFVO may send a second creation request to the VIM. The second creation request requests to create the first mirroring object, and the second creation request may include the name of the first mirroring object, the identifier of the first mirroring service associated with the first mirroring object, flow direction information, policy information, and port information. Further, the VIM may create the first mirroring object according to the second creation request. Optionally, after creating the first mirroring object according to the second creation request, the VIM may send a second creation response to the NFVO. The second creation response indicates that the first mirroring object is successfully created, and the second creation response may include the identifier allocated by the VIM to the first mirroring object.

In this embodiment of this application, after NS instantiation is completed, a mirroring object and/or a mirroring service corresponding to the NS may further be updated.

In a possible update scenario (for example, an update scenario 1), after NS instantiation is completed, the first mirroring service may be updated to a second mirroring service. In this case, the foregoing method further includes the following steps.

S607: The OSS/BSS sends a first update request to the NFVO, where the first update request requests to update the first mirroring service corresponding to the NS to the second mirroring service.

Herein, the first update request may include the NS instance identifier and second mirroring service information, and the second mirroring service information describes information for creating the second mirroring service. For example, the second mirroring service information may include a name of the second mirroring service, and may include a name of the second mirroring service, and may further include address information of an analysis system corresponding to the second mirroring service. The address information of the analysis system corresponding to the second mirroring service is different from the address information of the analysis system corresponding to the first mirroring service. The name of the second mirroring service is the same as the name of the first mirroring service. Further, the NFVO may determine that the first update request is used to update the first mirroring service to the second mirroring service.

S608: The NFVO requests, according to the first update request, the VIM to update the first mirroring service to the second mirroring service.

Specifically, the NFVO may request, according to the first update request, the VIM to delete the first mirroring service. For example, the NFVO sends a first deletion request to the VIM. The first deletion request includes the identifier of the first mirroring service. Further, the VIM may delete the first mirroring service according to the first deletion request, and send a first deletion response to the NFVO. The first deletion response indicates that the first mirroring service is successfully deleted. After determining that the VIM successfully deletes the first mirroring service, the NFVO may request, based on the second mirroring service information, the VIM to create the second mirroring service. For specific implementation of requesting to create the second mirroring service, refer to the description of requesting to create the first mirroring service. Details are not described herein again.

Further, the NFVO may request, according to the first update request, the VIM to delete a mirroring object (for example, the first mirroring object) associated with the first mirroring service. For example, the NFVO may send a second deletion request to the VIM. The second deletion request includes an identifier of the first mirroring object. Further, the VIM may delete the first mirroring object according to the second deletion request, and send a second deletion response to the NFVO. The second deletion response indicates that the first mirroring object is successfully deleted. After determining that the VIM successfully deletes the first mirroring object, the NFVO may update the first mirroring object information to second mirroring object information (for example, update the name or the identifier that is included in the first mirroring object information and that is of the first mirroring service associated with the first mirroring object to the name or an identifier of the second mirroring service, to obtain the second mirroring object information). The second mirroring object information describes information for creating a second mirroring object, the second mirroring object is for mirroring the first data flow, and the second mirroring object is associated with the second mirroring service. Further, the NFVO may request, based on the second mirroring object information, the VIM to create the second mirroring object. For specific implementation of requesting to create the second mirroring object, refer to the description of requesting to create the first mirroring object. Details are not described herein again.

In this way, after creating the second mirroring object and the second mirroring service, the VIM may subsequently transmit a mirrored data flow of the first data flow to the analysis system corresponding to the second mirroring service for analysis.

In the foregoing update scenario 1, after S607 and S608 are performed, the method may further include the following steps.

S609: The OSS/BSS sends a second update request to the NFVO, where the second update request requests to add a third mirroring object.

Herein, the second update request includes third mirroring object information, the third mirroring object information describes information for creating a third mirroring object, the third mirroring object is for mirroring a second data flow, and the third mirroring object is associated with the second mirroring service. For example, if the second data flow is an inbound data flow to a second VNF included in the NS or an outbound data flow from the second VNF, the third mirroring object information may include a name of the third mirroring object, the name (or the identifier) of the second mirroring service associated with the third mirroring object, information (for example, flow direction information, policy information, and an identifier of an external connection point of the second VNF) used to specify the second data flow. Optionally, the third mirroring object information may further include mirroring position information.

S610: The NFVO requests, based on the third mirroring object information, the VIM to create the third mirroring object.

For specific implementation of requesting, by the NFVO, to create the third mirroring object, refer to the description of requesting to create the first mirroring object. Details are not described herein again.

In another possible update scenario (for example, an update scenario 2), after NS instantiation is completed, the first mirroring object may be updated to a fourth mirroring object. In this case, the foregoing method further includes the following steps.

S611: The OSS/BSS sends a third update request to the NFVO, where the third update request requests to update the first mirroring object to the fourth mirroring object.

Herein, the third update request includes fourth mirroring object information, the fourth mirroring object information describes information for creating the fourth mirroring object, the fourth mirroring object is for mirroring a third data flow, and the fourth mirroring object may be associated with the first mirroring service. For example, if the third data flow is an inbound data flow to a third VNF included in the NS or an outbound data flow from the third VNF, the fourth mirroring object information may include a name of the fourth mirroring object, the name (or the identifier) of the first mirroring service associated with the fourth mirroring object, and information (for example, flow direction information, policy information, and an identifier of an external connection point of the third VNF) for specifying the third data flow. Optionally, the fourth mirroring object information may further include mirroring position information.

S612: The NFVO requests, according to the third update request, the VIM to update the first mirroring object to the fourth mirroring object.

Specifically, the NFVO may request the VIM to delete the first mirroring object; and after determining that the VIM successfully deletes the first mirroring object, request, based on the fourth mirroring object information, the VIM to create the fourth mirroring object.

It is to be noted that, the two possible update scenarios are used as examples in the foregoing to describe an update procedure for completing NS instantiation. The solution in this embodiment of this application may also be applicable to another possible update scenario, for example, an update scenario 3 in which a fifth mirroring object is added. The fifth mirroring object may be associated with the first mirroring service. Details are not described.

According to the foregoing method, the current NSD information is extended, to include mirroring object information (the extended NSD information may further include mirroring service information). In this way, the data flow that needs to be mirrored can be specified in a design state, and a mirroring object (and a mirroring service) can be automatically created during NS deployment, thereby implementing an end-to-end (that is, from the OSS/BSS to the VIM) data flow mirroring service.

With reference to a specific example, the following describes the data flow mirroring method provided in this embodiment of this application.

Embodiment 2

Figure 7:
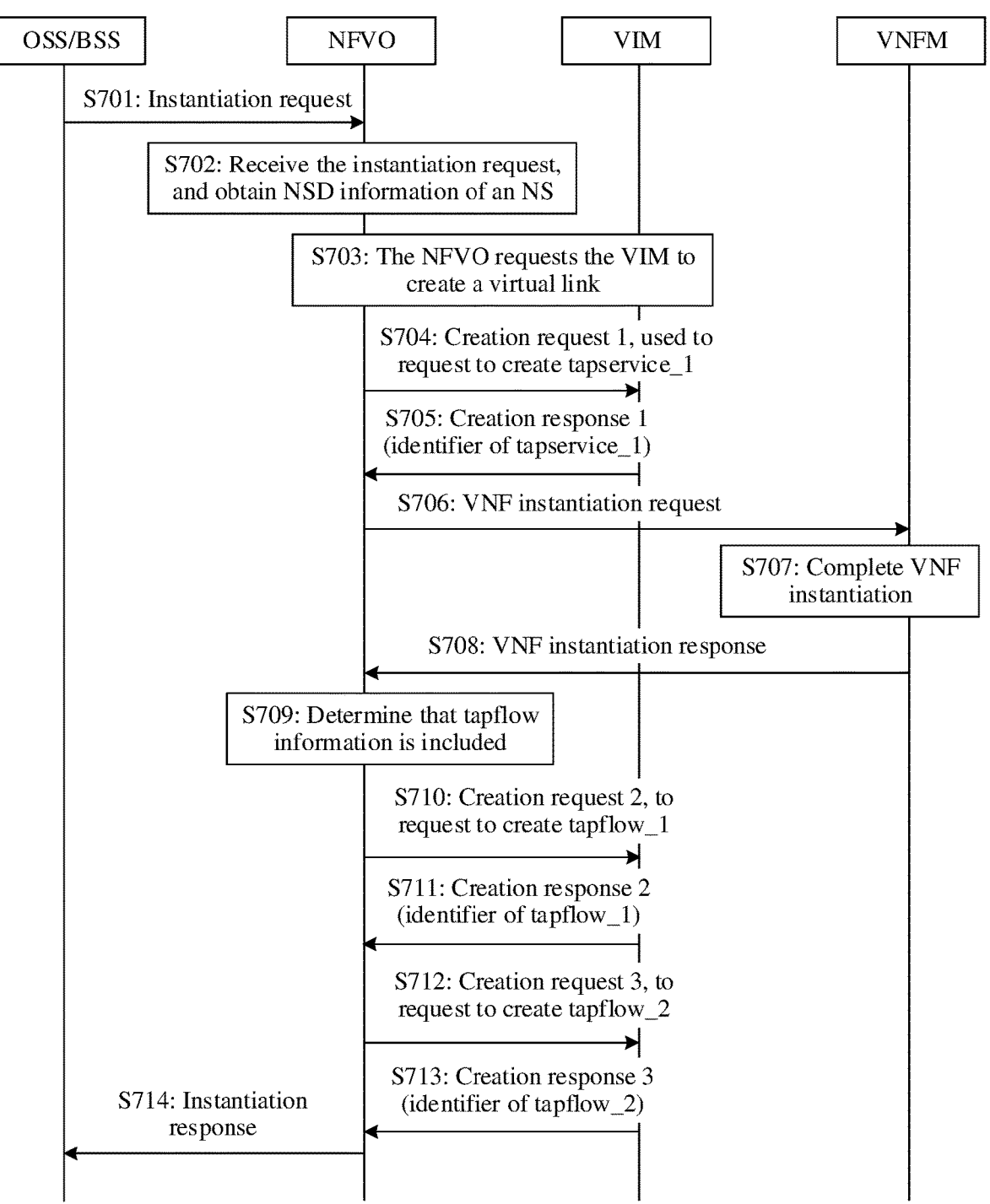
FIG. 7 is a schematic flowchart corresponding to a data flow mirroring method according to Embodiment 2 of this application.

FIG. 7 is a schematic flowchart corresponding to a data flow mirroring method according to Embodiment 2 of this application. As shown in FIG. 7, the method includes the following steps.

S701: An OSS/BSS sends an instantiation request to an NFVO, where the instantiation request requests to instantiate an NS.

S702: The NFVO receives the instantiation request, and obtains NSD information of the NS based on the instantiation request.

For example, the NSD information may include VLD information and VNFD information, and may further include tapflow information (for example, tapflow_1 information and tapflow_2 information) and tapservice information (for example, tapservice_1 information).

For content included in the tapflow_1 information, refer to Table 5.

TABLE 5

| Example of the content included in the tapflow_1 information | |
|---|---|
| flow_name | tapflow_1 |
| direction | In |
| tapservice_name | tapservice_1 |
| flow_policy | None |
| position | CP |
| CpdId | ExtCp_1 |

A data flow that needs to be mirrored and that is specified by the tapflow_1 information is an inbound data flow to ExtCp_1 of a VNF 1.

For content included in the tapflow_2 information, refer to Table 6.

TABLE 6

| Example of the content included in the tapflow_2 information | |
|---|---|
| flow_name | tapflow_2 |
| direction | Out |
| tapservice_name | tapservice_1 |
| flow_policy | source_ip: 10.1.1.2 |
| position | VL |
| CpdId | ExtCp_2 |

A data flow that needs to be mirrored and that is specified by the tapflow_2 information is an outbound data flow from an IP address 10.1.1.2 of ExtCp_2 of a VNF 2.

For content included in the tapservice_1 information, refer to Table 7.

TABLE 7

| Example of the content included in the tapservice_1 information | |
| --- | --- |
| tapservice_name | tapservice_1 |
| address_info | Ip: 10.10.1.1 |

S703: The NFVO requests, based on the VLD information (that is, description information of VL_1) included in the NSD, a VIM to create a corresponding virtual link.

S704: The NFVO sends a creation request 1 to the VIM based on the tapservice_1 information included in the NSD, where the creation request 1 requests to create tapservice_1.

Herein, the creation request 1 may include a name of tapservice 1.

S705: The VIM creates tapservice_1 according to the creation request 1, and sends a creation response 1 to the NFVO, where the creation response 1 indicates that tapservice_1 has been successfully created.

Herein, the creation response 1 may include an identifier allocated by the VIM to tapservice 1.

S706: The NFVO sends a VNF instantiation request to a VNFM based on the VNFD information included in the NSD information.

S707: The VNFM completes VNF instantiation based on the VNFD information.

For example, for the VNF 1, an instantiation process of the VNF 1 includes: for an external connection point (ExtCp_1) of the VNF 1, applying to the VIM for creating corresponding port information (for example, a port 1) on VL-1, and establishing a connection to ExtCp_1 through the port 1, to connect the VNF 1 to a VL-1 network instance. For the VNF 2, an instantiation process of the VNF 2 includes: for an external connection point (ExtCp_2) of the VNF 2, applying to the VIM for creating corresponding port information (for example, a port 2) on VL-1, and establishing a connection to ExtCp_2 through the port 2, to connect the VNF 2 to the VL-1 network instance.

S708: The VNFM returns a VNF instantiation response to the NFVO, where the VNF instantiation response indicates that VNF instantiation is completed.

S709: The NFVO checks, based on NsVirtualLinkConnectivity information included in the NSD, whether tapflow information is included, and if the NFVO determines that the tapflow information (for example, tapflow_1 information and tapflow_2 information) is included, performs S710 to S713.

S710: The NFVO determines a creation request 2 based on the tapflow_1 information, and sends the creation request 2 to the VIM, where the creation request 2 requests to create tapflow_1.

S711: The VIM receives the creation request 2, creates tapflow_1 according to the creation request 2, and returns a creation response 2 to the NFVO, where the creation response 2 indicates that tapflow_1 has been successfully created, and the creation response 2 may include an identifier allocated by the VIM to tapflow_1.

Specifically, that the NFVO determines a creation request 2 based on the tapflow_1 information may include: (1) The NFVO obtains, from the VNFM based on an identifier (that is, ExtCp_1) of an external connection point in the tapflow_1 information, port information (that is, a port 1) corresponding to the external connection point. For example, the NFVO sends, to the VNFM, a request for obtaining port information. The request includes the identifier of the external connection point. Further, after receiving the request, the VNFM may send a response to the NFVO. The response includes the port information corresponding to the external connection point. (2) If the NFVO determines that the tapflow_1 information includes mirroring position information, and the mirroring position information is a connection point, the NFVO may obtain, from the VNFM, security group rule information corresponding to an external connection point. For example, the security group rule information is as follows: direction: ingress; protocol: TCP; port_range_min:16; port_range_max:65535. The security group rule information indicates that only a data flow that requests to enter ExtCp_1 and that uses the TCP protocol and a service port whose number is between 16 and 65535 can enter ExtCp_1. In this way, the creation request 2 may include the security group rule information and the port information, and may further include a name of tapflow_1, flow direction information, and an identifier of an associated tapservice. In addition, because the tapflow_1 information does not include policy information, the creation request 2 may not include the policy information.

S712: The NFVO determines a creation request 3 based on the tapflow_2 information, and sends the creation request 3 to the VIM, where the creation request 3 requests to create tapflow_2.

S713: The VIM receives the creation request 3, creates tapflow_2 according to the creation request 3, and returns a creation response 3 to the NFVO, where the creation response 3 indicates that tapflow_2 has been successfully created, and the creation response 3 may include an identifier allocated by the VIM to tapflow_2.

Specifically, that the NFVO determines a creation request 3 based on the tapflow_2 information may include: (1) The NFVO obtains, from the VNFM based on an identifier (that is, ExtCp_2) of an external connection point in the tapflow_2 information, port information (that is, a port 2) corresponding to the external connection point. (2) If the NFVO determines that the tapflow_2 information includes mirroring position information, but the mirroring position information is a VL, the NFVO does not need to obtain the security group rule information in this case. In this way, a second creation request may include the port information, and may further include a name of tapflow_2, flow direction information, and an identifier of an associated tapservice. In addition, because the tapflow_2 information includes policy information, the creation request 3 may further include the policy information.

S714: The NFVO sends an instantiation response to the OSS/BSS, where the instantiation response indicates that NS instantiation is completed.

It is to be noted that in Embodiment 1, the description is provided by using an example in which NSD information includes tapflow information (for example, tapflow_1 information and tapflow_2 information) and tapservice information (for example, tapservice_1 information). If tapservice_1 associated with tapflow_1 and tapflow_2 is a created tapservice, the NSD information may not include the tapservice_1 information. In this case, S704 and S705 may not be performed.

Based on the NS instantiation procedure described in Embodiment 2, the following describes a possible update procedure after NS instantiation with reference to Embodiment 3.

Embodiment 3

Figure 8:
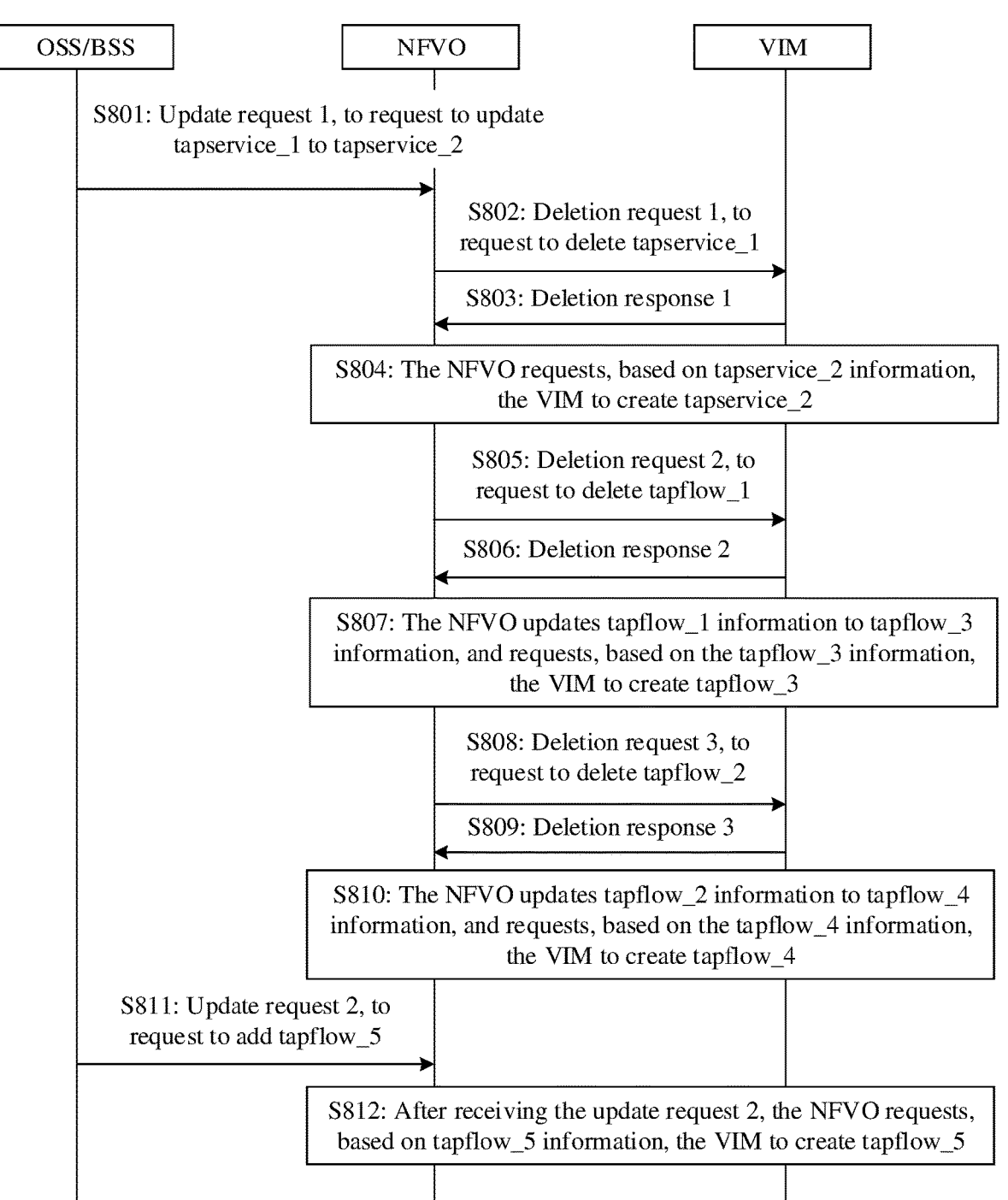
FIG. 8 is a schematic flowchart corresponding to a data flow mirroring method according to Embodiment 3 of this application.

FIG. 8 is a schematic flowchart corresponding to a data flow mirroring method according to Embodiment 3 of this application. As shown in FIG. 8, the method includes the following steps.

S801: An OSS/BSS sends an update request 1 to an NFVO, where the update request requests to update tapservice_1 to tapservice 2, and the update request 1 may include an NS instance identifier and tapservice_2 information. A name of tapservice_2 included in the tapservice_2 information may be the same as a name of tapservice 1.

For content included in the tapservice_2 information, refer to Table 8.

TABLE 8

| Example of the content included in the tapservice_2 information | |
| --- | --- |
| tapservice_name | tapservice_2 (tapservice_1) |
| address_info | Ip: 10.10.1.2 |

S802: The NFVO receives the update request 1, and sends a deletion request 1 to a VIM based on the update request 1, where the deletion request 1 requests to delete tapservice_1.

Herein, the deletion request 1 may include an identifier of tapservice_1.

S803: The VIM receives the deletion request 1, deletes tapservice_1 according to the deletion request 1, and returns a deletion response 1 to the NFVO, where the deletion response 1 indicates that tapservice_1 is successfully deleted.

S804: The NFVO requests, based on the tapservice_2 information, the VIM to create tapservice_2.

For an implementation in which the NFVO requests the VIM to create tapservice_2, refer to the implementation in which the NFVO requests the VIM to create the first mirroring service in Embodiment 1. Details are not described again.

S805: The NFVO sends a deletion request 2 to the VIM based on the update request 1, where the deletion request 2 requests to delete tapflow_1 associated with tapservice_1.

Herein, the deletion request 2 may include an identifier of tapflow_1.

S806: The VIM receives the deletion request 2, deletes tapflow_1 according to the deletion request 2, and returns a deletion response 2 to the NFVO, where the deletion response 2 indicates that tapflow_1 is successfully deleted.

S807: The NFVO updates tapflow_1 information to tapflow_3 information (that is, updates a name of tapservice_1 in the tapflow_1 information to a name of tapservice 2), and requests, based on the tapflow_3 information, the VIM to create tapflow_3.

For content included in the tapflow_3 information, refer to Table 9.

TABLE 9

| Example of the content included in the tapflow_3 information | |
| --- | --- |
| flow_name | tapflow_1 |
| direction | In |
| tapservice_name | tapservice_2 |
| flow_policy | None |
| position | CP |
| CpdId | ExtCp_1 |

For an implementation in which the NFVO requests, based on the tapflow_3 information, the VIM to create tapflow_3, refer to the implementation in which the NFVO requests the VIM to create the first mirroring object in Embodiment 1. Details are not described again.

S808: The NFVO sends a deletion request 3 to the VIM based on the update request 1, where the deletion request 3 requests to delete tapflow_2 associated with tapservice_1.

Herein, the deletion request 3 may include an identifier of tapflow_2.

S809: The VIM receives the deletion request 3, deletes tapflow_2 according to the deletion request 3, and returns a deletion response 3 to the NFVO, where the deletion response 3 indicates that tapflow_2 is successfully deleted.

S810: The NFVO updates tapflow_2 information to tapflow_4 information (that is, updates a name of tapservice_1 in the tapflow_2 information to an identifier of tapservice_2), and requests, based on the tapflow_4 information, the VIM to create tapflow_4.

For content included in the tapflow_4 information, refer to Table 10.

TABLE 10

| Example of the content included in the tapflow_4 information | |
| --- | --- |
| flow_name | tapflow_2 |
| direction | Out |
| tapservice_name | tapservice_2 |
| flow_policy | source_ip: 10.1.1.2 |
| position | VL |
| CpdId | ExtCp_2 |

For an implementation in which the NFVO requests, based on the tapflow_4 information, the VIM to create tapflow_4, refer to the implementation in which the NFVO requests the VIM to create the first mirroring object in Embodiment 1. Details are not described again.

S811: The OSS/BSS sends an update request 2 to the NFVO, where the update request 2 requests to add tapflow_5, and the update request 2 includes the NS instance identifier and tapflow_5 information.

For content included in the tapflow_5 information, refer to Table 11.

TABLE 11

| Example of content included in the tapflow_5 information | |
| --- | --- |
| flow_name | tapflow_5 |
| direction | Out |
| tapservice_name | tapservice_2 |
| flow_policy | None |
| position | CP |
| CpdId | ExtCp_1 |

The tapflow_5 information describes the following: A data flow that needs to be mirrored is an outbound data flow from ExtCp_1 of a VNF 1 and tapflow_5 is associated with newly established tapservice_2.

S812: After receiving the update request 2, the NFVO requests, based on the tapflow_5 information, the VIM to create tapflow_5.

Specifically, it is determined that the tapflow_5 information includes mirroring position information, and the mirroring position information is a connection point. Therefore, the NFVO may obtain, from a VNFM, security group rule information corresponding to an external connection point. For example, the security group rule information is as follows: direction: outgress; protocol: TCP; port_range_min:16; port_range_max:65535. The security group rule information indicates that only a data flow that requests to flow out of ExtCp_1 and that uses the TCP protocol and a service port whose number is between 16 and 65535 can be sent. In addition, the NFVO may further obtain port information (that is, a port 1) corresponding to ExtCp_1. Further, the NFVO may request, based on the security group rule information, the port information, and other information (for details, refer to Embodiment 1), the VIM to create tapflow_5.

For Embodiment 1 to Embodiment 3 described above, it is to be noted that numbers of the steps in the flowcharts described in Embodiment 1 to Embodiment 3 are merely an example of an execution procedure, and do not constitute any limitation on an execution sequence of the steps. In embodiments of this application, there is no strict execution sequence between steps that do not have a time sequence dependency relationship with each other. In addition, not all the steps shown in the flowcharts are mandatory steps, and some steps may be added to or deleted from the flowcharts based on an actual requirement.

The foregoing mainly describes the solutions provided in embodiments of this application from a perspective of interaction between the devices. It may be understood that, to implement the foregoing functions, each device may include a corresponding hardware structure and/or software module for implementing each function. A person skilled in the art should be easily aware that, in embodiments of this application, the units and algorithm steps in the examples described with reference to embodiments disclosed in this specification can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, each device may be divided into functional units based on the foregoing method examples. For example, the functional units may be obtained through division based on corresponding functions, or two or more functions may be integrated into one unit. The integrated unit may be implemented in a form of hardware, or may be implemented in a form of a software functional unit.

Figure 9:
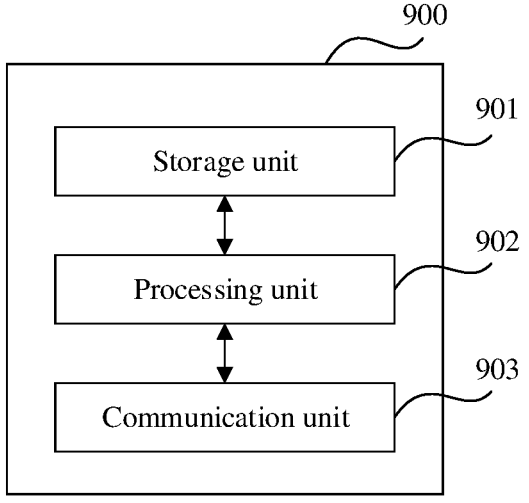
FIG. 9 is a possible schematic block diagram of an apparatus according to an embodiment of this application.

When an integrated unit is used, FIG. 9 is a possible example block diagram of an apparatus according to an embodiment of this application. As shown in FIG. 9, the apparatus 900 may include a processing unit 902 and a communication unit 903. The processing unit 902 is configured to control and manage an action of the apparatus 900. The communication unit 903 is configured to support communication between the apparatus 900 and another device. Optionally, the communication unit 903 is also referred to as a transceiver unit, and may include a receiving unit and/or a sending unit, respectively configured to perform a receiving operation and a sending operation. The apparatus 900 may further include a storage unit 901 that is configured to store program code and/or data of the apparatus 900.

The apparatus 900 may be the NFVO in the foregoing embodiments. The processing unit 902 may support the apparatus 900 in performing actions of the NFVO in the foregoing method examples. Alternatively, the processing unit 902 mainly performs an internal action of the NFVO in the method examples, and the communication unit 903 may support communication between the apparatus 900 and another device.

Specifically, in an embodiment, the communication unit 903 is configured to receive an instantiation request from an operation support system/business support system OSS/BSS, where the instantiation request requests to instantiate a network service NS. The processing unit 902 is configured to obtain NS description NSD information based on the instantiation request, where the NSD information includes first mirroring object information, the first mirroring object information describes information for creating a first mirroring object, and the first mirroring object is for mirroring a first data flow. The communication unit 903 is further configured to request, based on the first mirroring object information, a virtualized infrastructure manager VIM to create the first mirroring object, where the first mirroring object is associated with a first mirroring service, and the first mirroring service is for analyzing a mirrored data flow of the first data flow.

In a possible design, the first data flow is an inbound data flow to a first VNF included in the NS or an outbound data flow from the first VNF.

In a possible design, the NSD information further includes first mirroring service information, and the first mirroring service information describes information for creating the first mirroring service. The communication unit 903 is further configured to request, based on the first mirroring service information, the VIM to create the first mirroring service.

In a possible design, the first mirroring service information includes a name of the first mirroring service. The communication unit 903 is specifically configured to: send a query request to the VIM, where the query request includes the name of the first mirroring service; receive a query response from the VIM, where the query response includes address information of an analysis system corresponding to the first mirroring service; and send a first creation request to the VIM, where the first creation request requests to create the first mirroring service, and the first creation request includes the name of the first mirroring service and the address information of the analysis system corresponding to the first mirroring service.

In a possible design, the first mirroring object information includes an identifier of an external connection point of the first VNF. The communication unit 903 is specifically configured to: obtain, from a VNFM based on the identifier of the external connection point, port information corresponding to the external connection point; and send a second creation request to the VIM, where the second creation request requests to create the first mirroring object, and the second creation request includes the port information.

In a possible design, the first mirroring object information further includes mirroring position information. The communication unit 903 is further configured to: when the mirroring position information is a connection point, obtain, from the VNFM, security group rule information corresponding to the external connection point, where the second creation request further includes the security group rule information, and the first data flow is a data flow that conforms to the security group rule information.

In a possible design, the communication unit 903 is further configured to obtain policy information, where the second creation request further includes the policy information, and the first data flow is a data flow that conforms to the policy information.

In a possible design, the communication unit 903 is further configured to: receive a first update request from the OSS/BSS, where the first update request requests to update the first mirroring service to a second mirroring service, the first update request includes second mirroring service information, and the second mirroring service information describes information for creating the second mirroring service; request, according to the first update request, the VIM to delete the first mirroring service; and after the processing unit 902 determines that the VIM successfully deletes the first mirroring service, request, based on the second mirroring service information, the VIM to create the second mirroring service.

In a possible design, the communication unit 903 is further configured to request, according to the first update request, the VIM to delete the first mirroring object associated with the first mirroring service. The processing unit 902 is further configured to: after determining that the VIM successfully deletes the first mirroring object, update the first mirroring object information to second mirroring object information, where the second mirroring object information describes information for creating a second mirroring object, the second mirroring object is for mirroring the first data flow, and the second mirroring object is associated with the second mirroring service. The communication unit 903 is further configured to request, based on the second mirroring object information, the VIM to create the second mirroring object.

In a possible design, the communication unit 903 is further configured to: receive a second update request from the OSS/BSS, where the second update request requests to add a third mirroring object, the second update request includes third mirroring object information, the third mirroring object information describes information for creating the third mirroring object, the third mirroring object is for mirroring a second data flow, and the third mirroring object is associated with the second mirroring service; and request, based on the third mirroring object information, the VIM to create the third mirroring object.

In a possible design, the communication unit 903 is further configured to: receive a third update request from the OSS/BSS, where the third update request requests to update the first mirroring object to a fourth mirroring object, the third update request includes fourth mirroring object information, the fourth mirroring object information describes information for creating the fourth mirroring object, the fourth mirroring object is for mirroring a third data flow, and the fourth mirroring object is associated with the first mirroring service; request, according to the third update request, the VIM to delete the first mirroring object; and after the processing unit 902 determines that the VIM successfully deletes the first mirroring object, request, based on the fourth mirroring object information, the VIM to create the fourth mirroring object.

It should be understood that division into units in the apparatus is merely logical function division. During actual implementation, all or some of the units may be integrated into one physical entity or may be physically separated. In addition, all the units in the apparatus may be implemented in a form in which a processing element invokes software, or may be implemented in a form of hardware; or some units may be implemented in a form in which a processing element invokes software, and some units are implemented in a form of hardware. For example, each unit may be a separately disposed processing element, or may be integrated into a chip of the apparatus for implementation. In addition, each unit may alternatively be stored in a memory in a form of a program to be invoked by a processing element of the apparatus to perform a function of the unit. In addition, all or some of the units may be integrated, or may be implemented independently. The processing element herein may also be referred to as a processor, and may be an integrated circuit having a signal processing capability. In an implementation process, operations in the foregoing methods or the foregoing units may be implemented by using a hardware integrated logic circuit in the processor element, or may be implemented in a form in which the processing element invokes software.

In an example, a unit in any one of the foregoing apparatuses may be one or more integrated circuits configured to implement the foregoing methods, for example, one or more application-specific integrated circuits (application-specific integrated circuit, ASIC), one or more microprocessors (digital signal processor, DSP), one or more field programmable gate arrays (field programmable gate array, FPGA), or a combination of at least two of these forms of integrated circuits. For another example, when the units in the apparatus may be implemented in a form in which a processing element schedules a program, the processing element may be a processor, for example, a general-purpose central processing unit (central processing unit, CPU) or another processor that can invoke the program. For still another example, the units may be integrated and implemented in a form of a system-on-a-chip (system-on-a-chip, SOC).

The foregoing unit configured for receiving is an interface circuit of the apparatus, and is configured to receive a signal from another apparatus. For example, when the apparatus is implemented in a form of a chip, the receiving unit is an interface circuit that is of the chip and that is configured to receive a signal from another chip or apparatus. The foregoing unit configured for sending is an interface circuit of the apparatus, and is configured to send a signal to another apparatus. For example, when the apparatus is implemented in the form of the chip, the sending unit is an interface circuit that is of the chip and that is configured to send a signal to another chip or apparatus.

Figure 10:
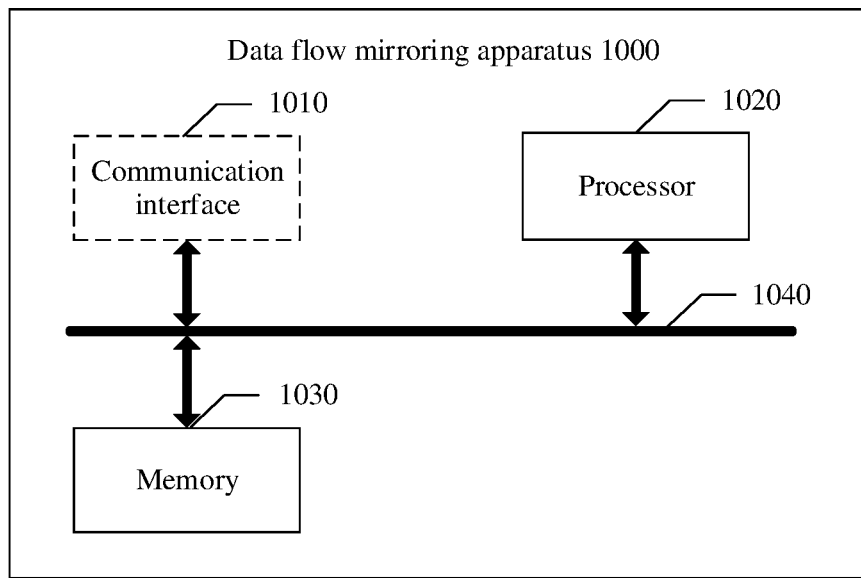
FIG. 10 is a schematic diagram of a structure of a data flow mirroring apparatus according to an embodiment of this application.

FIG. 10 shows a data flow mirroring apparatus 1000 according to an embodiment of this application. The data flow mirroring apparatus 1000 may be the NFVO in the embodiments shown in FIG. 6 to FIG. 8, and can implement functions of the NFVO in the methods provided in embodiments of this application. Alternatively, the data flow mirroring apparatus 1000 may be an apparatus that can support the NFVO in implementing the functions of the NFVO in the methods provided in the embodiments of this application. The data flow mirroring apparatus 1000 may be a chip system. In this embodiment of this application, the chip system may include a chip, or may include a chip and another discrete component.

The data flow mirroring apparatus 1000 may further include at least one memory 1030, configured to store program instructions and/or data. The memory 1030 is coupled to a processor 1020. The coupling in this embodiment of this application may be an indirect coupling or a communication connection between apparatuses, units, or modules, may be in an electrical form, a mechanical form, or another form, and is used for information exchange between the apparatuses, the units, or the modules. The processor 1020 may cooperate with the memory 1030. The processor 1020 may execute the program instructions stored in the memory 1030. At least one of the at least one memory may be included in the processor.

The data flow mirroring apparatus 1000 may further include a communication interface 1010, configured to communicate with another device through a transmission medium, so that an apparatus in the data flow mirroring apparatus 1000 can communicate with the another device. For example, the another device may be a control device. The processor 1020 may send and receive data through the communication interface 1010.

A specific connection medium between the communication interface 1010, the processor 1020, and the memory 1030 is not limited in this embodiment of this application. In this embodiment of this application, the memory 1030, the processor 1020, and the communication interface 1010 are connected to each other through a bus 1040 in FIG. 10. The bus is represented by using a bold line in FIG. 10. A connection manner between other components is merely an example for description, and no limitation is set thereto. The bus may be classified into an address bus, a data bus, a control bus, and the like. For ease of representation, only one bold line is used for representing the bus in FIG. 10, but this does not mean that there is only one bus or only one type of bus.

In this embodiment of this application, the processor 1020 may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in embodiments of this application. The general-purpose processor may be a microprocessor or any conventional processor or the like. The steps in the method disclosed with reference to embodiments of this application may be directly performed by a hardware processor, or may be performed by using a combination of hardware in the processor and a software module.

In this embodiment of this application, the memory 1030 may be a non-volatile memory, for example, a hard disk drive (hard disk drive, HDD) or a solid-state drive (solid-state drive, SSD), or may be a volatile memory (volatile memory), for example, a random access memory (random access memory, RAM). The memory is any other medium that can be used to carry or store expected program code in a form of an instruction or a data structure and that can be accessed by a computer, but no limitation is set thereto. The memory in this embodiment of this application may alternatively be a circuit or any other apparatus that can implement a storage function, and is configured to store the program instructions and/or the data.

An embodiment of this application further provides a computer-readable storage medium. The storage medium stores a computer program. When the computer program is executed, the methods performed by the NFVO in the embodiments shown in FIG. 6 to FIG. 8 are implemented.

An embodiment of this application further provides a computer program product. When a computer reads and executes the computer program product, the computer is enabled to perform the methods performed by the NFVO in the embodiments shown in FIG. 6 to FIG. 8.

An embodiment of this application provides a chip system. The chip system includes a processor and may further include a memory, and is configured to implement functions of the NFVO in the foregoing methods. The chip system may include a chip, or may include a chip and another discrete component.

An embodiment of this application provides a data flow mirroring system. The system includes the foregoing NFVO and another device, and the another device may include at least one of an OSS/BSS, a VIM, and a VNFM.

In embodiments of this application, "at least one" means one or more, and "a plurality of" means two or more. "And/or" describes an association relationship between associated objects and represents that three relationships may exist. For example, A and/or B may represent the following cases: Only A exists, both A and B exist, and only B exists, where A and B each may be in a singular or plural form. The character "/" generally indicates that the associated objects are in an "or" relationship. "At least one item (piece) of the following" or a similar expression thereof indicates any combination of the items, and includes a singular item (piece) or any combination of plural items (pieces). For example, "at least one of A, B, and C" includes A, B, C, AB, AC, BC, or ABC. In addition, unless otherwise specified, ordinal numbers such as "first" and "second" mentioned in embodiments of this application are used to distinguish between a plurality of objects, but are not used to limit a sequence, a time sequence, priorities, or importance of the plurality of objects.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a magnetic disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more procedures in the flowcharts and/or in one or more blocks in the block diagrams.

These computer program instructions may alternatively be stored in a computer-readable memory that can instruct the computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

It is clearly that a person skilled in the art can make various modifications and variations to this application without departing from the spirit and scope of this application. Thus, if these modifications and variations of this application fall within the scope of the claims of this application and equivalent technologies thereof, this application is also intended to include these modifications and variations.

What is claimed is:

1. A data flow mirroring method, wherein the method comprises:

receiving an instantiation request from an operation support system/business support system (OSS/BSS), wherein:

the instantiation request requests to instantiate a network service (NS),

NS description (NSD) information is based on the instantiation request, the NSD information comprises first mirroring object information, the first mirroring object information describes information for creating a first mirroring object, and the first mirroring object is for mirroring a first data flow;

requesting, based on the first mirroring object information, a virtualized infrastructure manager (VIM) to create the first mirroring object, wherein the first mirroring object is associated with a first mirroring service; and receiving a response from the VIM, the response indicates that the first mirroring object for mirroring the first data flow is successfully created.

2. The method according to claim 1, wherein the first data flow is an inbound data flow to a first virtualized network function (VNF) comprised in the NS, or an outbound data flow from the first VNF.

3. The method according to claim 2, wherein the first mirroring object information comprises an identifier of an external connection point of the first VNF; and the requesting, based on the first mirroring object information, the VIM to create the first mirroring object comprises:

receiving, from a virtualized network function manager (VNFM) based on the identifier of the external connection point, port information corresponding to the external connection point; and sending a second creation request to the VIM, wherein the second creation request requests to create the first mirroring object, and the second creation request comprises the port information.

4. The method according to claim 1, wherein the NSD information further comprises first mirroring service information, and the first mirroring service information describes information for creating the first mirroring service; and the method further comprises:

requesting, based on the first mirroring service information, the VIM to create the first mirroring service.

5. The method according to claim 4, wherein the first mirroring service information comprises a name of the first mirroring service; and the requesting, based on the first mirroring service information, the VIM to create the first mirroring service comprises:

sending a query request to the VIM, wherein the query request comprises the name of the first mirroring service;

receiving a query response from the VIM, wherein the query response comprises address information of a system corresponding to the first mirroring service; and sending a first creation request to the VIM, wherein the first creation request requests to create the first mirroring service, and the first creation request comprises the name of the first mirroring service and the address information of the system corresponding to the first mirroring service.

6. A data flow mirroring method, wherein the method comprises:

sending an instantiation request from an operation support system/business support system (OSS/BSS) to a network functions virtualization orchestrator (NFVO), wherein:

the instantiation request requests to instantiate a network service (NS),

NS description (NSD) information is based on the instantiation request, the NSD information comprises first mirroring object information, the first mirroring object information describes information for creating a first mirroring object, and the first mirroring object is for mirroring a first data flow;

requesting, based on the first mirroring object information, a virtualized infrastructure manager (VIM) to create the first mirroring object, wherein the first mirroring object is associated with a first mirroring service;

creating the first mirroring object in response to the requesting; and sending, from the VIM to the NFVO, a response indicating that the first mirroring object for mirroring the first data flow is successfully created.

7. The method according to claim 6, wherein the first data flow is an inbound data flow to a first virtualized network function (VNF) comprised in the NS, or an outbound data flow from the first VNF.

8. The method according to claim 7, wherein the first mirroring object information comprises an identifier of an external connection point of the first VNF; and the requesting, based on the first mirroring object information, the VIM to create the first mirroring object comprises:

receiving, from a virtualized network function manager (VNFM) based on the identifier of the external connection point, port information corresponding to the external connection point; and sending a second creation request to the VIM, wherein the second creation request requests to create the first mirroring object, and the second creation request comprises the port information.

9. The method according to claim 6, wherein the NSD information further comprises first mirroring service information, and the first mirroring service information describes information for creating the first mirroring service; and the method further comprises:

requesting, based on the first mirroring service information, the VIM to create the first mirroring service.

10. The method according to claim 9, wherein the first mirroring service information comprises a name of the first mirroring service; and the requesting, based on the first mirroring service information, the VIM to create the first mirroring service comprises:

sending a query request to the VIM, wherein the query request comprises the name of the first mirroring service;

33 receiving a query response from the VIM, wherein the query response comprises address information of a system corresponding to the first mirroring service; and sending a first creation request to the VIM, wherein the first creation request requests to create the first mirroring service, and the first creation request comprises the name of the first mirroring service and the address information of the system corresponding to the first mirroring service.

11. An apparatus, comprising:

a transceiver;

at least one processor; and one or more memories coupled to the at least one processor and storing programming instructions executable by the at least one processor to cause the apparatus to:

receive an instantiation request from an operation support system/business support system (OSS/BSS), wherein:

the instantiation request requests to instantiate a network service (NS),

NS description (NSD) information is based on the instantiation request, the NSD information comprises first mirroring object information, the first mirroring object information describes information for creating a first mirroring object, and the first mirroring object is for mirroring a first data flow;

request, based on the first mirroring object information, a virtualized infrastructure manager (VIM) to create the first mirroring object, wherein the first mirroring object is associated with a first mirroring service; and receive a response from the VIM, the response indicates that the first mirroring object for mirroring the first data flow is successfully created.

12. The apparatus according to claim 11, wherein the first data flow is an inbound data flow to a first virtualized network function (VNF) comprised in the NS, or an outbound data flow from the first VNF.

13. The apparatus according to claim 12, wherein the first mirroring object information comprises an identifier of an external connection point of the first VNF; and the programming instructions are executable by the at least one processor to further cause the apparatus to:

receive, from a virtualized network function manager (VNFM) based on the identifier of the external connection point, port information corresponding to the external connection point; and send a second creation request to the VIM, wherein the second creation request requests to create the first mirroring object, and the second creation request comprises the port information.

14. The apparatus according to claim 11, wherein the NSD information further comprises first mirroring service information, and the first mirroring service information describes information for creating the first mirroring service; and the programming instructions are executable by the at least one processor to further cause the apparatus to:

request, based on the first mirroring service information, the VIM to create the first mirroring service.

15. The apparatus according to claim 14, wherein the first mirroring service information comprises a name of the first mirroring service; and

the programming instructions are executable by the at least one processor to further cause the apparatus to:

send a query request to the VIM, wherein the query request comprises the name of the first mirroring service;

receive a query response from the VIM, wherein the query response comprises address information of a system corresponding to the first mirroring service; and send a first creation request to the VIM, wherein the first creation request requests to create the first mirroring service, and the first creation request comprises the name of the first mirroring service and the address information of the system corresponding to the first mirroring service.

16. A data flow mirroring system, wherein the system comprises an operation support system/business support system (OSS/BSS), a network functions virtualization orchestrator (NFVO) and a virtualized infrastructure manager (VIM), wherein:

the OSS/BSS comprises at least one first processor and at least one first memory, and the at least one first processor is configured to execute instructions stored in the at least one first memory to cause the OSS/BSS to send an instantiation request to the NFVO, wherein the instantiation request requests to instantiate a network service (NS);

the NFVO comprises at least one second processor and at least one second memory, and the at least one second processor is configured to execute instructions stored in the at least one second memory to cause the NFVO to:

receive the instantiation request, wherein:

NS description (NSD) information is based on the instantiation request, the NSD information comprises first mirroring object information, the first mirroring object information describes information for creating a first mirroring object, and the first mirroring object is for mirroring a first data flow; and request the VIM to create the first mirroring object based on the first mirroring object information; and the VIM comprises at least one third processor and at least one third memory, and the at least one third processor is configured to execute instructions stored in the at least one third memory to cause the VIM to:

create the first mirroring object upon being requested by the NFVO, wherein the first mirroring object is associated with a first mirroring service; and send, to the NFVO, a response indicating that the first mirroring object for mirroring the first data flow is successfully created.

17. The system according to claim 16, wherein the first data flow is an inbound data flow to a first virtualized network function (VNF) comprised in the NS, or an outbound data flow from the first VNF.

18. The system according to claim 17, wherein the first mirroring object information comprises an identifier of an external connection point of the first VNF;

the NFVO is further configured to:

receive, from a virtualized network function manager (VNFM) based on the identifier of the external connection point, port information corresponding to the external connection point; and send a second creation request to the VIM, wherein the second creation request requests to create the first mirroring object, and the second creation request comprises the port information; and the VIM is configured to:

receive the second creation request, and create the first mirroring object in response to the second creation request.

19. The system according to claim 16, wherein the NSD information further comprises first mirroring service information, and the first mirroring service information describes information for creating the first mirroring service;

the NFVO is further configured to request, based on the first mirroring service information, the VIM to create the first mirroring service; and the VIM is further configured to create the first mirroring service upon being requested by the NFVO.

20. The system according to claim 19, wherein the first mirroring service information comprises a name of the first mirroring service;

the NFVO is further configured to:

send a query request to the VIM, wherein the query request comprises the name of the first mirroring service;

receive a query response from the VIM, wherein the query response comprises address information of a system corresponding to the first mirroring service; and send a first creation request to the VIM, wherein the first creation request requests to create the first mirroring service, and the first creation request comprises the name of the first mirroring service and the address information of the system corresponding to the first mirroring service; and the VIM is further configured to:

receive the query request, send the query response, receive the first creation request, and create the first mirroring service in response to the first creation request.

\* \* \* \* \*